United States Patent [19]

Boucher et al.

[11] Patent Number: 5,458,739

[45] Date of Patent: Oct. 17, 1995

[54] VOLATILES SEPARATOR AND CONCENTRATOR

[75] Inventors: Armand R. Boucher; Philip N. Hambrick, both of Louisville, Ky.

[73] Assignee: Vendome Copper & Brass Works, Louisville, Ky.

[21] Appl. No.: 191,873

[22] Filed: Feb. 4, 1994

[51] Int. Cl.$^6$ .................................. B01D 3/10; B01D 3/32
[52] U.S. Cl. ..................... 202/153; 202/159; 202/173; 202/176; 202/177; 202/205; 202/236; 202/267.1; 203/19; 203/29; 203/86; 203/88; 203/90; 203/91; 203/DIG. 6; 426/493; 426/494
[58] Field of Search ...................... 202/176, 177, 202/181, 153, 158, 236, 205, 267.1; 203/90, 91, 88, 29, 1, 2, DIG. 6, 86, 18, 19; 426/492–494; 159/48.1, 3

[56] References Cited

U.S. PATENT DOCUMENTS

| | | |
|---|---|---|
| 235,521 | 12/1880 | Fox . |
| 257,489 | 5/1882 | Goewey . |
| 1,286,315 | 12/1918 | Heuser . |
| 1,493,756 | 5/1924 | La Bour ................................. 203/90 |
| 1,541,296 | 2/1925 | Uihleiu . |
| 1,553,748 | 9/1925 | Caspar . |
| 1,800,940 | 4/1931 | Heuser . |
| 3,002,896 | 10/1961 | Buck ....................................... 426/492 |
| 3,280,009 | 10/1966 | Ackermann et al. ................... 203/90 |
| 3,291,613 | 12/1966 | Raible . |
| 4,009,230 | 2/1977 | Smorenburg ........................... 203/90 |
| 4,021,628 | 5/1980 | Church et al. ......................... 202/158 |
| 4,405,652 | 9/1983 | Boucher . |
| 4,465,559 | 8/1984 | Won ........................................ 203/90 |
| 4,600,477 | 7/1986 | Higashi et al. . |
| 4,643,083 | 2/1987 | Boucher . |
| 5,176,883 | 1/1993 | Smith et al. ........................ 203/DIG. 6 |
| 5,232,550 | 8/1993 | Takashi et al. ........................ 203/90 |

FOREIGN PATENT DOCUMENTS 2134541 2/1983 United Kingdom .

OTHER PUBLICATIONS

Spray Systems Company, Wheaton, Ill., Catalogue No. 51, Section C, pp. 4, 5, 1991.

*Primary Examiner*—Wilbur Bascomb, Jr.
*Attorney, Agent, or Firm*—Middleton & Reutlinger; David W. Carrithers

[57] ABSTRACT

An apparatus and method for stripping volatiles from a feed stream and concentrating the volatiles in the overhead vapors forming a condensate product and simultaneously producing a low percent volatiles outlet stream as a concentrate product. The volatiles separator and concentrator, ("VSC"), unit has many applications in the reduction and the concentration of volatiles in the beverage, fuel, and industrial alcohol industries, as well as in chemical applications for removing or stripping volatiles from heat sensitive feed substrates which require low temperatures and a short residence time to prevent degradation of the product.

The preferred embodiment of the VSC unit utilizes a short feed stream preheat contact time in combination with turbulent high velocity flow at temperatures below 100° F. to provide flash aporization for volatiles separation with reboil capability to adjust volatiles concentration in the residue and product. The application of high vacuum in the range of 27" to 28.5" of Hg further enhances volatiles separation by allowing lower processing temperatures and reduced residence time. The low pressures and temperatures are energy efficient and serve to minimize heat degradation producing a non-heat sensitized product/residue. Because of the design of the equipment utilized in the VSC unit, a plurality of VSC modular units can be connected in a series providing a processing system having compact dimensions.

12 Claims, 10 Drawing Sheets

VOLATILES SEPARATOR AND CONCENTRATOR

BACKGROUND OF THE INVENTION

Current technology to produce reduced alcoholic beverages and alcohol free beverages as defined by the Bureau of Alcohol, Tobacco and Firearms Division of the U.S. Treasury Department as not being wine or beer for tax purposes and the beverage has less than 0.5% alcohol content by volume. It is hereby understood that if this limit varies it is intended that the term "alcohol free" as used here shall vary accordingly. Systems in use today to produce reduced alcoholic beverages and alcohol free beer and wine vary in the industry as indicated herein.

Conventional commercial methods utilized to reduce alcohol in wines is by film evaporation, in beer by proprietary fermentation technology, and in distilled spirits by reverse osmosis systems. For instance, "Alcohol free" beer and wine may be produced by film evaporation and reverse osmosis technology.

Film evaporation briefly described falls into two general categories, falling film and single stage evaporation. In film evaporation, application of heat from steam at elevated pressures on one side of a heat transfer plate or tube type and the product feed to the other side of the plate or tube produces heat which is transferred through the plate or tube energizing the falling film as a result of the differential of the boiling point of the binary mixture of water and alcohol. The alcohol vapor product along with some water leaves the liquid phase and becomes vapor phase. The equilibrium of the vapor phase is a result of the temperature applied, contact time, percent alcohol of feed substrate and the vacuum applied to the system. The liquid phase contains the residual water, alcohol, non-volatiles and other organic compounds with boiling points higher than alcohol with insufficient time to vaporize during the contact time and temperatures available.

Agitated film evaporation is accomplished by applying mechanical agitation such as utilized in forced circulation evaporation units (multi-stage) and/or revolving cones within a unit. Spinning cone mechanisms provide for a thinner film layer, reduced contact time and enhanced phase separation as opposed to falling film and forced circulation types. The reduced contact time does not apply to the multistage forced circulation evaporation which is agitated film evaporation. These processes result in greater contact time and consequent flavor deterioration for heat sensitive substrates such as processed in the food and beverage industry.

In processes using one or more revolving cones or spinning cones, the phase separation occurs at the barrier metal between steam on one side and beverage on the other side. Vacuum may also be used in these systems to lower the boiling point required for separation. For heat sensitive alcohol processes, steam temperatures of about 250° F. are usually regulated by a control valve to provide steam temperatures at about 150° F. which are applied to the steam barrier side of the evaporation/distillation unit. The steam temperature is dependent on the steam pressure used and is consistent with the steam table references in thermodynamics. Therefore, there will be differences in the quality of the liquid phase product produced from heat sensitive products processed in spinning cone evaporation/distillation units as compared to the products processed in falling film evaporation, i.e., the spinning cone produces a product with less heat degradation and of better quality.

Alternative means of separating chemical constituents such as reverse osmosis require application of very high pressures to the beverage feed in the membrane system thereby creating a driving force across the membrane surface. This driving force is based on the porosity of the membrane. The process produces a retentate product which contains the high molecular weight organic compounds unable to pass through the membrane, including those indigenous in the fermentation such as acids, color compounds, and most of the higher alcohols forming a reduced alcohol concentrate product; and the permeate product which contains alcohol, water, and other low molecular weight organic compounds such as methyl alcohol, acetals, and aldehydes. This type of separation system is independent of a phase change.

The conventional methods currently available to produce a reduced alcohol and alcohol free wine or beer require a high capital investment and prohibits small producers such as micro breweries and small wineries from providing reduced alcohol products. In addition, conventional processing equipment requires extensive training for the operators and maintenance cost and energy consumption are high. Operating parameters for conventional separation equipment are limited due to the equipment design, i.e., feed rate must conform to the design criteria, start-up and shut-down are set by the desired product run involved. Sanitation of the equipment requires specific chemical agents for any of the existing systems after each operation of the equipment and their proper environmental disposal. All of the aforementioned systems require large capital investment and efficient operation is unresponsive to market shifts in demand.

With the exception of the reverse osmosis, the use of heat derived from steam supply through the barrier heat exchangers to the liquid film on the surface causes bubbles to form out of the film. As the bubble forms and burst, the change of state occurs relative to the boiling points of the binary mixture, i.e., the alcohol and water leave the surface based on their boiling point characteristics. Therefore, the surface area of the film is the limiting factor for the change of state required to accomplish phase separation based on boiling point at specific vacuum conditions. The present invention circumvents this precise limitation of surface area limited by the equipment area provided in existing equipment but does incorporate massive surface area for phase change, i.e., from liquid to vapor phase to provide instantaneous phase change as does the present invention.

The present Volatiles Separator and Concentrator "VSC", invention relates to an apparatus and method for stripping volatiles from a feed stream, concentrating the volatiles in overhead vapors forming a condensate product, and producing a low percent alcohol concentrate product outlet stream as a residue or tails within a single modular unit and in the same unit operation. Moreover, the modular VSC unit provides a continuous system of reducing the alcohol content of wine, beer, distilled spirits by exposing the original beverage to low temperature processing in the VSC unit. Using low temperature and short residence times to expose the product to heat from a selected heat transfer medium provides a means to remove a selected liquid phase as a reduced alcohol beverage product and the vapor phase as an increased alcoholic product in seconds or fractions thereof. The VSC unit provides a means for minimizing degradation to the organoleptic properties of the substrate and provides protection for the color constituents from heat degradation, thereby maintaining the desired color concentration of the product.

The vapor phase product may be condensed for second and/or multiple stage processing to the desired alcohol strength. The high vacuum conditions from 27" mercury to 28.5" mercury short residence time prevents scorching and organoleptic degradation of the reduced alcohol beverage product. The process may be controlled to produce either reduced alcohol beverages or non-alcoholic beverages from wine, beer or matured distilled spirits. The VSC unit can be manufactured to scale so that small beverage producers can enter the market now open generally only to the major corporations with high capital investment requirements for systems now available. Moreover, the modular system can be manufactured to a higher capacity production depending on the scale of the operation required.

Accordingly, it is a principal object of the present invention to provide a volatile separator and concentrator for use with heat sensitive substrates containing flavor compounds and color compounds, as well as non heat sensitive binary mixtures, It is an objective of the present invention to provide a means of separating chemical constituents from heat sensitive products while eliminating or minimizing degradation of the vapor and liquid products.

It is an objective of the present invention to provide a volatile separator and concentrator for use with or without vacuum.

It is an objective of the present invention to provide a volatile separator and concentrator which minimizes the residence time to which heat sensitive feed substrates are subjected to heat.

It is an objective of the present invention to provide a volatile separator and concentrator in a modular unit which may be connected together in a series to provide a process to further separate, protect, and concentrate selected volatile components, increase yield, and improve quality of the selected congeners.

It is yet another objective to utilize the volatile separator and concentrator of the present invention to separate and concentrate flavor constituents or congeners of heat sensitive products.

It is yet another objective to utilize the volatile separator and concentrator of the present invention to provide a means to improve the quality of reduced and alcohol-free beverages being produced for the market.

It is yet another objective to utilize the volatile separator and concentrator of the present invention to provide lower cost capital equipment for the manufacturers.

It is another objective of the present invention to provide a volatile separator and concentrator which requires no mechanical motion equipment other than pumps permitting stable high vacuum performance, and is simple to operate and automate.

It is yet another objective to utilize the volatile separator and concentrator of the present invention to provide an improved process for the manufacture of reduced alcohol beverage products.

It is another objective to provide a means for separating striping, and/or concentrating hazardous and polluting compounds from a feed substrate.

It is an objective of the present invention to provide an apparatus and method for fractional distillation of flavor components and recombination of the desired flavor congeners to enhance the flavor and organoleptic properties of the final condensate or concentrate product(s).

It is yet another objective to utilize the volatile separator and concentrator of the present invention to provide modular equipment and for use in processes requiring mobility from one location to another without limitation to times of harvest or seasons of the year.

It is yet another objective to utilize the volatile separator and concentrator of the present invention to provide reduced alcohol and alcohol free beverage products, to provide lower calorie identified beverages, to provide improved shelf life of the products produced on this process over existing conventional systems.

SUMMARY

The volatile separator and concentrator, "VSC", unit is a compact unit modularized for stripping volatiles (such as ethyl alcohol constituents) from a alcohol containing feed stream and concentrate the volatile congeners in the overhead vapors or product within the same unit operation. The principle application for the VSC unit is in the low temperature concentration of congeners and reduction of alcohol in heat sensitive substrates to form a reduced alcohol concentrate product and for simultaneously increasing the amount of alcohol in the vapor condensate product.

The invention utilizes short feed stream preheat contact, time, turbulent high velocity flow at temperatures below 100° F., flash vaporization for volatiles separation with reboil capability to adjust volatiles concentration in the concentrate product. The application of high vacuum in the range of 20 to 29.5" Hg further enhances volatiles separation by allowing lower temperatures and pressures in the feed stream. These lower pressures and temperatures are very energy efficient and allow for a non heat sensitized concentrate product. Because of the style of equipment utilized in this system, it can be modularized into a small process volume. For example, a feed flow rate of 300 gph can be processed in a module approximately 8 feet wide×16 feet long.

The preferred embodiment of a single stage volatiles separator and concentrator unit comprises a first expansion chamber having sidewalls and being formed having an upper frustoconical portion connected to an inverted lower frustoconical portion having the maximum diameter in the central region thereof. A preheater is in fluid connection with the first expansion chamber. An atomizing spray nozzle is disposed within the first expansion chamber for spraying a hollow cone pattern producing a layer of droplets striking the sidewalls at the maximum diameter of the central region. A base collector is attached to the lower inverted frustoconical portion in fluid communication therewith. A vacuum chamber attached to the upper frustoconical portion is in fluid communication therewith. Also, a pump is used for pressurizing a feed substrate and pumping the feed substrate through the preheater and the spray nozzle. The device includes a means for supplying heat to the preheater such as steam in fluid connection therewith. At least one condenser is used for condensing vapors collected in the vacuum chamber. A means such as a pump is used for removing condensate product from the condenser, and for forming a vacuum in the expansion chamber. Furthermore, a control means is used for regulating the vacuum in the first expansion chamber and pressure and flow rate through said atomizing spray nozzle. Moreover, one or more additional expansion chambers may be stacked between the vacuum chamber and collector base. Typically the expansion chamber positioned below the spray nozzle in the expansion chamber will contain a baffle cone to direct nonvaporized droplets to the sidewalls and into the annular collector baffle.

The present invention comprises a continuous method of directly substantially reducing the alcohol content of an alcohol containing beverage to produce a low calorie beverage having a substantial amount of its original alcohol content. The process comprises the steps of feeding an alcohol containing feed substrate from a supply source through a feed line and through a preheater. The feed substrate is then pumped under pressure into a volatiles separator and concentrator unit having a vacuum expansion chamber having a frustoconical shaped upper portion and an inverted frustoconical lower portion. The expansion chamber has a sidewall with a maximum diameter in its central portion. A vacuum is pulled in the expansion chamber. The pressurized feed substrate is pumped through an atomizing nozzle disposed within the expansion chamber producing a hollow spray cone pattern forming a layer of small droplets extending to the side of the vacuum expansion chamber at the maximum diameter thereof. Vaporization of the droplets occurs between the nozzle and the sidewall forming a vapor containing alcohol. Any nonvolatilized droplets from the spray nozzle strike the sidewall forming a thin film of liquid feed substrate on the wall of the frustoconical shaped lower portion of thin expansion chamber. The feed substrate forming the thin film on the wall is further vaporized upon being exposed for a relatively short period of time to the convection currents, indirect heat transfer from said sidewall, and the vacuum in the expansion chamber producing a vaporized product. The nonvolatilized feed substrate is collected as a reduced alcohol concentrate product. The vaporized product passes through a condenser forming a condensate product and collected as a high proof alcohol product.

More particularly, in the preferred embodiment, a prefiltered feed stream containing volatiles such as alcohol is preheated to (100° to 140° F.) and fed through an inlet into the unit under 25" to 28" Hg vacuum. The feed is forced through a small atomizing nozzle for spraying the liquid in a 360° arc onto the side of the expansion chamber of the VSC unit, wherein the spray angle and expansion chamber angle are selected according to the viscosity of the feed substrate to vaporize the feed substrate by flashing and internal heat transfer due to convection currents formed within the unit due to the design of the unit to supplement the preheater heat. An annular ring plate attached to the interior sidewall of the expansion chamber extends inwardly at an angle forming an annular collector ring or annular collector baffle at the bottom of the expansion chamber providing a trough for collecting a desired amount of the reduced alcohol concentrate product which spills over into the fluid base collector or is diverted by an external tube and valve assembly. Moreover, an internal cone baffle prevents the free fall of mist or droplets into the collector base by directing and distributing the nonvolatilized liquid into the annular collector ring. The volatiles and flavor congeners are vaporized and flow upward and are concentrated in the alcohol stream which is condensed in the product condenser. The dealcoholized concentrated product containing low boiling chemical constituents forming congeners is cooled, collected, and stored for further use.

A major feature of the VSC unit is the use of an atomizer nozzle for spraying a uniform volume of feed substrate toward the internal walls of an expansion chamber of the VSC unit in a cone shaped spray pattern at a specific angle to instantaneously flash the atomized liquid droplets after leaving the nozzle and prior to striking the wall. The nonvolatilized spray droplets are sprayed onto the walls forming a thin film of liquid substrate on the interior surface which is further volatilized at high vacuum by flashing and evaporation upon striking the heated surface and further upon flowing downward thereon. The VSC unit does not use moving parts such as used with most vacuum evaporators. The design is simple, efficient, and inexpensive. Additional stages can be added to provide a means for fractional distillation recovery of the volatiles. Furthermore, a jacket can be formed to cover the lower portion of the VSC unit and heated to prevent radiation heat loss and provide additional heat transfer capacity for creating convection heat.

The VSC unit, although demonstrated on ethanol-water solutions, is not confined to this application. It will also be available for application to other binary mixtures or other mixtures which can be separated by way of the invention herein described. It is also not confined to operations under high vacuum but can be constructed to operate to separate other volatile compounds at pressures above the 760 mm absolute. The chemical and pharmaceutical industries use solvent extractions for many of their processes. This system could very well have application for solvent recovery over existing systems that are in vogue in these industries.

BRIEF DESCRIPTION OF THE DRAWINGS

A better understanding of the present invention will be had upon reference to the following description in conjunction with the accompanying drawings in which like numerals refer to like parts throughout the several views and wherein.

SPECIFICATION

The volatile separator and concentrator unit, ("VSC") unit 10, of the present invention is manufactured from readily available materials and simple in design. The preferred embodiment is comprised of metal, more particularly 304 stainless steel, or 316 stainless steel for the wine industry due to pitting with the 304. However, copper, brass, aluminum, titanium, and other metals and combinations thereof may be used in combination with or substituted for the stainless steel components of the present invention. The VSC unit 10 is designed to operate under high vacuum conditions to minimize heat degradation to heat sensitive products; however, the VSC unit 10 may also be used under atmospheric conditions for high temperature or high pressure applications.

Figure 1:
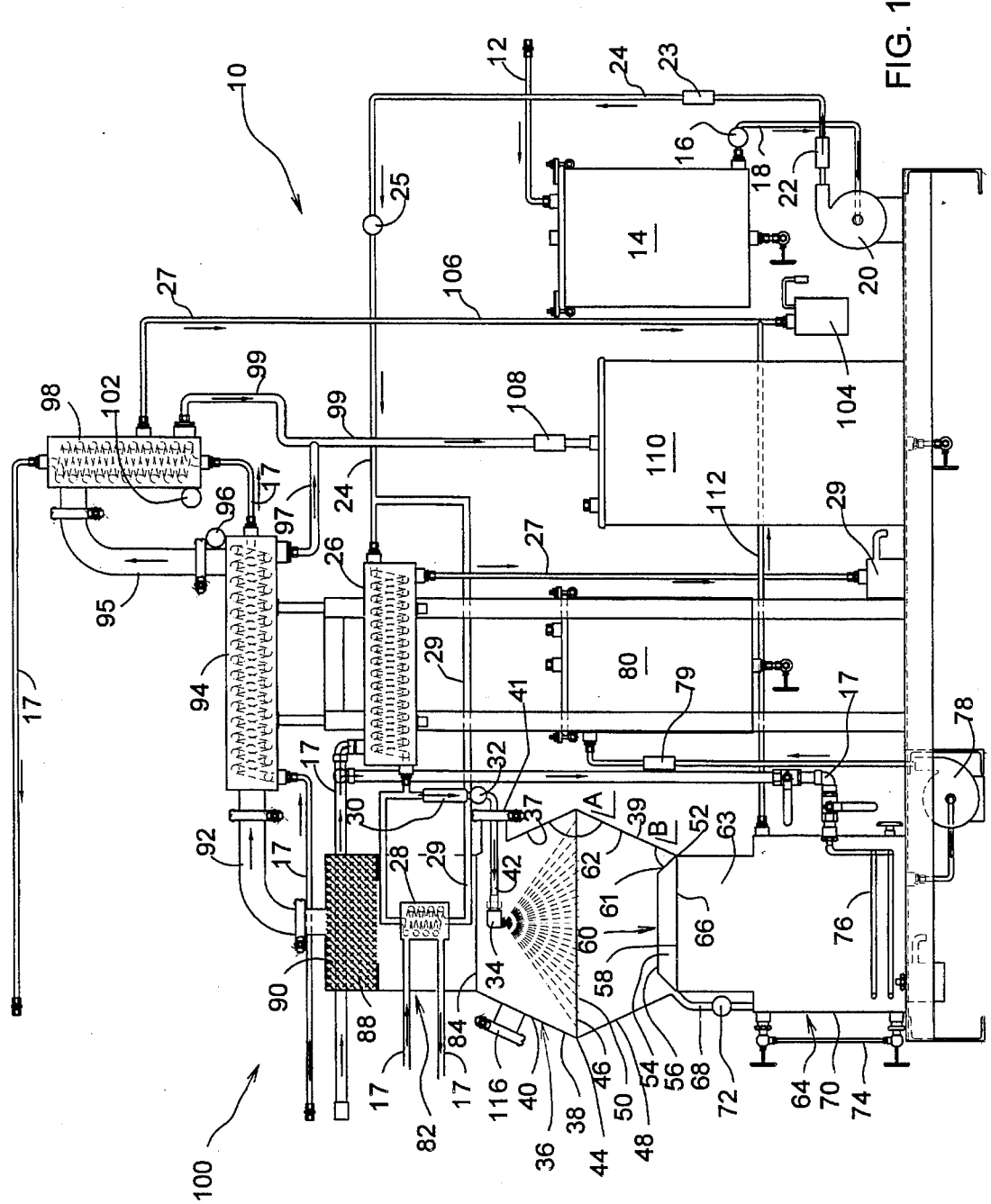
FIG. 1 is a front cutaway plan view showing the volatile separator and concentrator unit, feed preheater(s), primary condenser, vent condenser, condensate product tank, concentrate product tank, and feed tank for the VSC process system of the present invention.

Referring now to the drawings, FIG. 1 shows the modular VSC process system 10 of the present invention designed to separate and concentrate chemical constituents, more particularly, chemical constituents having heat sensitive substrates which would be susceptible to degradation at high temperatures. The selected feed liquid substrate of the preferred embodiment comprises wine, beer, matured spirits or other binary mixtures; however, it is contemplated that other chemical compositions may be separated concentrated, and/or stripped using the present invention.

Figure 4:
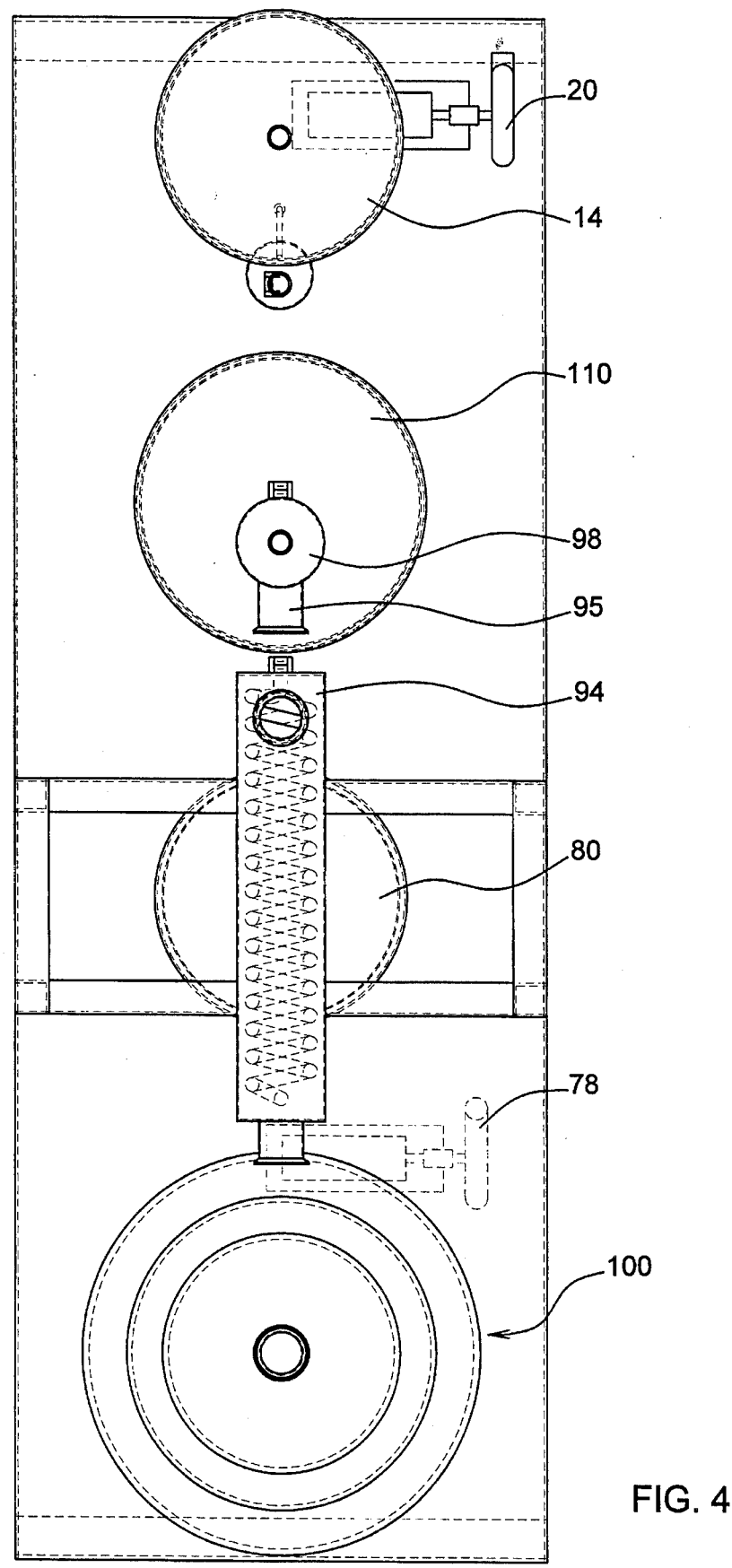
FIG. 4 is a cutaway plan top view showing the VSC unit of FIG. 1.
Figure 5:
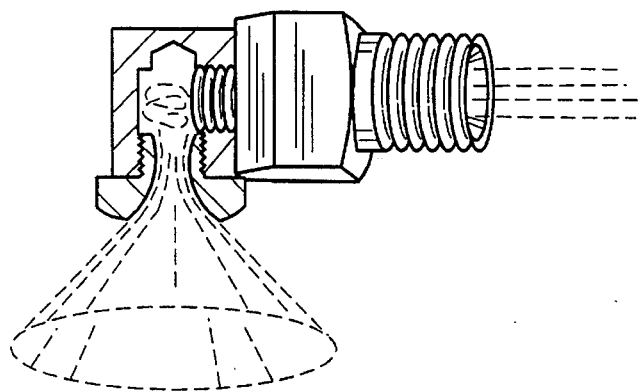
FIG. 5 is a cutaway side view of a hollow cone spray nozzle showing an internal grooved vane upstream from the orifice.
Figure 6:
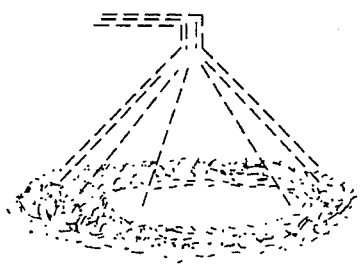
FIG. 6 is a side view showing a hollow cone spray pattern formed from the hollow cone spray nozzle of FIG. 5.
Figure 7:
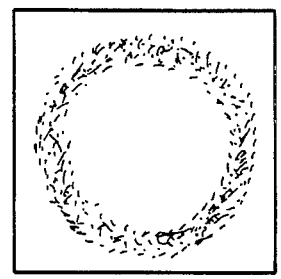
FIG. 7 is a top view showing a hollow cone spray pattern formed from the hollow cone spray nozzle of FIG. 5.
Figure 8:
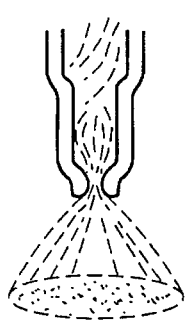
FIG. 8 is a cutaway side view of a full cone spray nozzle showing an internal vane imparting controlled turbulence to the liquid prior to the orifice.
Figure 9:
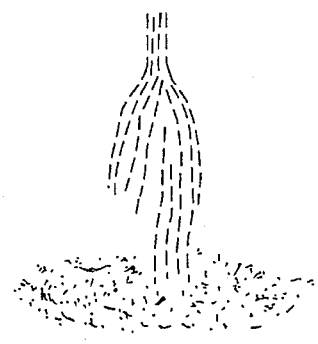
FIG. 9 is a side view showing a full cone spray pattern formed from the full cone spray nozzle of FIG. 8.
Figure 10:
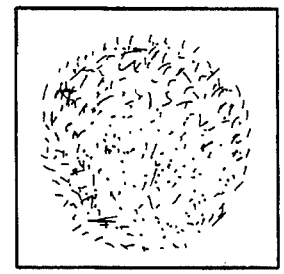
FIG. 10 is a top view showing a full cone spray pattern formed from the full cone spray nozzle of FIG. 8.

The single stage VSC modular unit 100 is incorporated as part of a VSC processing system 10 in FIGS. 1 and 4. A feed substrate such as a water/ethanol mixture contains from about 4% to about 14% alcohol. More particularly, the feed substrate in the instant example contained about a 7% to 12% ethanol mixture, such as is typical with a wine or beer, is degassed if necessary, and fed from a supply tank (not shown) through a supply line 12 to a feed tank 14 maintained at temperatures at from between about 40° F. to about 100° F. The feed substrate is fed from the feed tank 14 through valve 16 and line 18 to feed pump 20. The feed substrate is pumped at a pressure of about 30 to about 100 pounds per square inch gauge, "psig.", and from about 0.1 to about 12 gallons per hour ("gph"), preferably about 5 gph, through filter 22, preferably having 100 micron porosity, for removal of particulate rated at larger than 3 millimeters in diameter. The pressure of the original alcohol containing product being fed to the volatile separator concentrator 10 may be controlled and water introduced into the feed line when the pressure of the original alcohol containing feed substrate falls below a predetermined level to assure the feeding of an adequate amount of liquid into the volatile separator concentrator 10 to maintain the desired pressure through the atomizer spray nozzle 34. In the preferred embodiment, the feed substrate from the filter 22 is pumped through line 24 through an optional rotameter 23 and an optional control valve 25.

The feed substrate is fed directly through an external feed substrate preheater 26 supplied by feed line 24, or an optional first internal feed substrate preheater 28 supplied by feed line 29, or a combination thereof. A steam supply line 17 supplies the preheater 26, 28, (all steam supply and discharge lines for all heat transfer equipment are designated 17). A connecting line 27 between the steam side of the preheater to the top of a vapor separator 29 controls the heat temperature applied by the steam to the preheater 26, 28. The advantage of utilizing an external preheater 26 is the economics of construction and maintenance; however, the first internal preheater 28 provides a means to utilize the heat transfer from the process resulting in an energy savings and additional means to more accurately control the temperature of the feed substrate. Moreover, the bottom surface of the internal preheater 28 may be flat shaped, elliptically shaped, (shown in FIG. 2 in phantom lines), or cone shaped, for providing a baffle as an additional means to control entrainment of the volatile products. The preheater 26, 28 in the preferred embodiment is a shell and tube heat exchanger utilizing low pressure steam as the heating medium; however, plate and frame, spiral, or other heat exchangers are useable with other heating fluids such as hot oil, water, or glycol mixtures. The preheater 26, 28 controls the temperature of the substrate from the feed tank 14 at a selected temperature of from about 40° F. to about 180° F. at a to maintain a feed composition temperature to the atomizing spray nozzle 34 of the VSC unit at about 100° F.±40° F.

Regulation of the feed preheater 26, 28 temperature is by means of a vacuum line connected to the vacuum pump manifold, wherein gauges indicate the pressure and temperature of the preheater 26, 28 for regulation. Heat exchange with the low pressure steam, reduced to approximately 15 psig at about 250° F. is instantaneous and fluid flow is high velocity, turbulent flow. The reduced steam enters the heat transfer feed preheater 26, 28 at approximately 140° F. through a control valve. The steam vapor temperature of 140° F. drops instantaneously as it comes into contact with and touches the metal surface barrier condensing at a temperature or about 100° F. to about 110° F. which provides radiant heat to heat the heat sensitive feed substrate. The resulting steam condensate exists via the steam trap.

The feed substrate exiting the preheater 26, 28 is pumped directly through a rotameter 30, or as shown in the preferred embodiment through an optional control valve, more particularly a needle valve 32 located before the rotameter 30. Feed out of the rotameter 30 is forced under high pressure through a feed port 41 and nozzle supply line 42 and an atomizer spray nozzle 34 and separated into a volatile vapor product 43 and a nonvolatile liquid concentrate product 45.

As shown in FIGS. 1–3, the atomizing spray nozzle 34 extends into the body of the VSC unit 10 and is positioned to spray the feed substrate in a conical pattern forming a mist at a selected angle of from about 60 degrees to about 120 degrees downwardly into an expansion chamber 36 forming the main body of the VSC unit 10. The atomizer spray nozzle 34 has an orifice diameter of 0.0625 inches, specifically selected to produce liquid dispersion of each mist liquid particle size into a 1/100 of an inch diameter droplets at about 300 microns or less for the alcohol containing feed substrate described heretofore. The particle size may vary depending upon the density, viscosity, and volatility of the feed substrate solution; however, the atomizer nozzle 34 is of a design to produce a conical spray pattern within the VSC unit 10 so that the conical spray reaches a maximum diameter at the largest internal diameter of the VSC unit 10. The point of contact of the atomized spray with the walls of the expansion chamber 36 serves to provide for the optimal expansion, flashing, and cooling of the volatile bases 43, the optimal residence time before the liquid contacts the lower inner wall 62 of the expansion chamber 36, to maximize the exposed surface area of the lower wall 62, and provide mixing with the flashing vapors 43 of the atomized feed substrate with convention currents formed within the expansion chamber 36 containing volatilized vapors 43 from any secondary heating sources. The hollow cone spray pattern produced is essentially a circular ring of liquid. The pattern is generally formed by use of an inlet tangential to a whirl chamber, or by an internal grooved vane immediately upstream from the orifice. The whirling liquid results in a hollow cone configuration as it leaves the orifice.

The design and process operations for the atomizing spray nozzle 34 is an important criteria for the VSC unit 10 for high pressure spray forms small droplets having a massive surface area, as compared to larger droplets formed with conventional nozzles, which increases the evaporation potential of the alcohol or volatile product(s) 43 in the vapor phase. The phase change in the VSC unit is instantaneous due to latent heat contained within the preheated liquid stream and atomized through the spray nozzle. The latent heat is contained internally within and throughout the mass of each individual 300 micron droplet providing maximum heat transfer as opposed to conventional heat transfer evaporation methods relying upon conduction of the heat from a heat transfer surface to and through a film. An advantage of using a hollow cone spray pattern, as shown in FIGS. 5–7, is the development of a higher pressure differential through the hollow cone producing spray nozzle 34 for a given flow rate as compared to a full cone spray pattern, as shown in FIGS. 8–10, which is round, square, or oval in coverage, and completely filled with spray drops and therefore operates under a lower pressure differential at the same flow rate. The size of the drop particles is directly proportional to the pressure differential so that a low pressure results in large droplets and a higher pressure creates the small droplets at 300 microns or less which provides the low temperature volatilization of the feed substrate. Moreover, the hollow cone spray pattern provides the optimal time of exposure of the mist to the heat transfer area. The hollow cone design provides a layer of droplets and a means for the flashing the individual droplets so that the droplets do not coalesce and increase in size which decreases the surface area and heat transfer efficiency of the individual droplets. Moreover, the layered spray pattern minimizes entrainment of the droplets encountering the rising vapors produced from the flashing.

The preferred embodiment achieves the desired layered spray pattern and droplet size by utilizing about 5 to 7 atmospheres (about 73.5 to about 103 psig.) of pressure on the inboard side of the nozzle 34 in combination with about a −1 atmospheres (about −14.7 psig.) of vacuum on the outboard side of the nozzle 34, for a combined total of about 8 atmospheres of pressure differential to develop the mist yielding droplets having a particle under 300 microns.

The expansion chamber portion of the VSC unit 10 containing the spray nozzle 34 comprises a generally cylindrical main body having an interior wall surface 37. The expansion chamber 36 further includes an upper frustoconical expansion chamber 38 having a reduced diameter top portion 40 and an increased diameter bottom portion 44 of a larger diameter, connected to an increased diameter top portion top 46 of a lower frustoconical expansion chamber 48 by a central expansion chamber portion forming a waist 50, wherein the waist 50 has a maximum diameter equal to the bottom portion 44 and top portion 46, and greater than that of the expansion chamber top portion 40 or a reduced diameter expansion chamber bottom portion 52.

Joining of the upper frustoconical expansion chamber 38 to the lower frustoconical chamber 48 forms an obtuse angle, "Angle A", at the waist 50 of the expansion chamber 36 ranging from about 120 degrees to about 170 degrees depending upon the physical characteristics of the feed substrate and the processing conditions. More particularly, in the preferred embodiment, the specific obtuse angle, Angle A, formed by the walls 37 of the upper and lower frustoconical expansion chambers 38 and 48, respectively, is at an angle of 140 degrees; however, Angle A may be decreased to about 70 degrees without adversely affecting the performance of the VSC unit 10; however, it would be necessary to redefine the parameters for the design and operation of the spray nozzle 34 to maintain spray contact at the maximum diameter of the expansion chamber 36.

A means of retaining fluid draining from the inner wall 37 of the expansion chamber 36 is disposed within the expansion chamber 36 comprising flat strip of metal formed into a conical ring member 54 having a reduced diameter inner edge 56 and a increased diameter outer edge 58. The outer edge 58 is joined to the reduced diameter bottom portion 52 of the lower expansion chamber 48. The reduced diameter inner edge 56 of the conical ring member 54 forms the top of an angled annular liquid annular collector baffle 60. The outer surface 61 of the annular collector baffle 60 forms an acute angle, "Angle B", with the lower tapered wall 62 of the lower frustoconical expansion chamber 48 ranging from about 50 degrees to about 80 degrees. Angle B of the liquid annular collector baffle 60 limits the liquid retained within the annular collector baffle 60 and reduces internal contact time or exposure of the feed substrate with the heat transfer area. In the preferred embodiment, the liquid annular collector baffle 60 positioned at a 75 degree angle with respect to a horizontal plane at the waist 50 of the expansion chamber 36.

The spray angle, "Angle C", of the atomizer spray nozzle 34 selected for this purpose provides about a 90 degree spray angle conical or hollow spray. The atomizer nozzle 34 orifice diameter 0.0625" selected is of design to produce liquid dispersion of each mist liquid particle size under 300 microns. The small droplet size provides for a massive surface area for the higher volatile component 43 to leave the droplets allowing the less volatile liquid concentrate product 45 to hit the side wall. The liquid 45 which reaches the lower tapered wall 62 of the lower frustoconical expansion chamber 48 is such that it will coarse down the side of the sidewall 62 to the annular collector baffle 60. The combination of the precise feed substrate pump 20 pressure to the atomizer spray nozzle 34 into a vacuum formed within the expansion chamber 36 has been determined so as to allow the liquid phase to drain on a tangent to the liquid annular collector baffle 60.

Changing the obtuse angle, Angle A, requires a change in the atomizer spray nozzle discharge angle, "Angle C", ranging from about 60 degrees to about 120 degrees. Moreover, the atomizer spray nozzle 34 is precisely located to maximize the phase change from liquid to vapor in the expansion chamber 36 taking into consideration the physical characteristics of the feed substrate and Angle A of the expansion chamber 36 to maximize contact of the spray from the atomizer spray nozzle 34 with the lower tapered wall 62 of the lower frustoconical expansion chamber 48.

The expansion chamber 36 is mounted onto the head 63 of a generally cylindrical base fluid collector 64, so that the bottom 44 reduced diameter portion of the lower frustoconical expansion chamber 48 and the outer edge 58 of the annular collector baffle 60 are contiguous and in cooperative engagement with the top edge 66 of the base collector 64. The liquid annular collector baffle 60 is connected by a pipe line 68 to the base 70 of base collector 64, whereby the amount of overflow in the annular collector baffle 60 is controlled by a valve 72 and sight glass 74 assembly.

Because the base collector 64 is under vacuum, any reheating of the nonvolatilized product occurs at the same or lower temperatures and under the same vacuum conditions which were involved with the original temperatures for the entire VSC system 10 even though between about 120° F. to about 140° F. low pressure steam is may as an option be supplied thereto. The base collector 64 boosts the alcoholic portion into the vapor stage with same type of proprietary heat exchange between vapors and liquid as occurs within the expansion chamber 36. This in turn will encompass a temperature change of the vapors leaving the base collector 64 into the expansion chamber 36 of the VSC unit 10. This facilitates a change of state providing more water, (dealcoholized product), to return to the base collector 64 at the base 70 and allow enriched vapors to flow into the expansion chamber 36 of the VSC unit 10.

An optional spiral pancake coil tubular heat exchanger 76, is utilized in the preferred embodiment of the base collector 64 for cooling or heating of the liquid concentrate product 45. The pancake coil 76 is supplied with low pressure steam or heated fluid for use as a heater to provide additional heat transfer to the nonvolatilized liquid product 45. Upon reaching a selected level and/or concentration the liquid product is pumped by product pump 78 from the base collector 64 to the liquid product tank 80, or optionally back into the feed substrate stream. When used as a cooler the pancake coil 76, is supplied with chilled water or some other cooling medium and the nonvolatilized concentrate product is pumped into a holding tank for storage and/or regassing with the desired amount of $CO_2$.

In the base collector 64, the pancake coil 76 is immersed in the liquid 45 which is been received from the above mentioned liquid annular collector baffle 60. Additional vapor boosting occurs as a film type phase change. However, the liquid immersion will be minimal to reduce the residence time of contact for heat sensitive substrates. The heat applied by the coil is regulated between about 120° F. and about 140° F. The liquid within the base collector 64 will not exceed a temperature of about 99° F. at the prescribed vacuum of 28 inches of mercury.

The liquid concentrate product 45 collected within the base collector 34 produced from processing the alcohol/water feed substrate as described in the aforementioned example consists of a reduced alcohol or alcohol free beer. The reduced alcohol concentrate product 45 is pumped through a cooler, such as a plate heat exchanger (not shown), through a rotameter 79 and into product tank 80. In the event of lower alcohol compositions wines or beer or non-alcoholic or alcohol free products, the reduced alcohol product 45 should be kept under refrigeration or cool temperatures for product protection.

Figure 2:
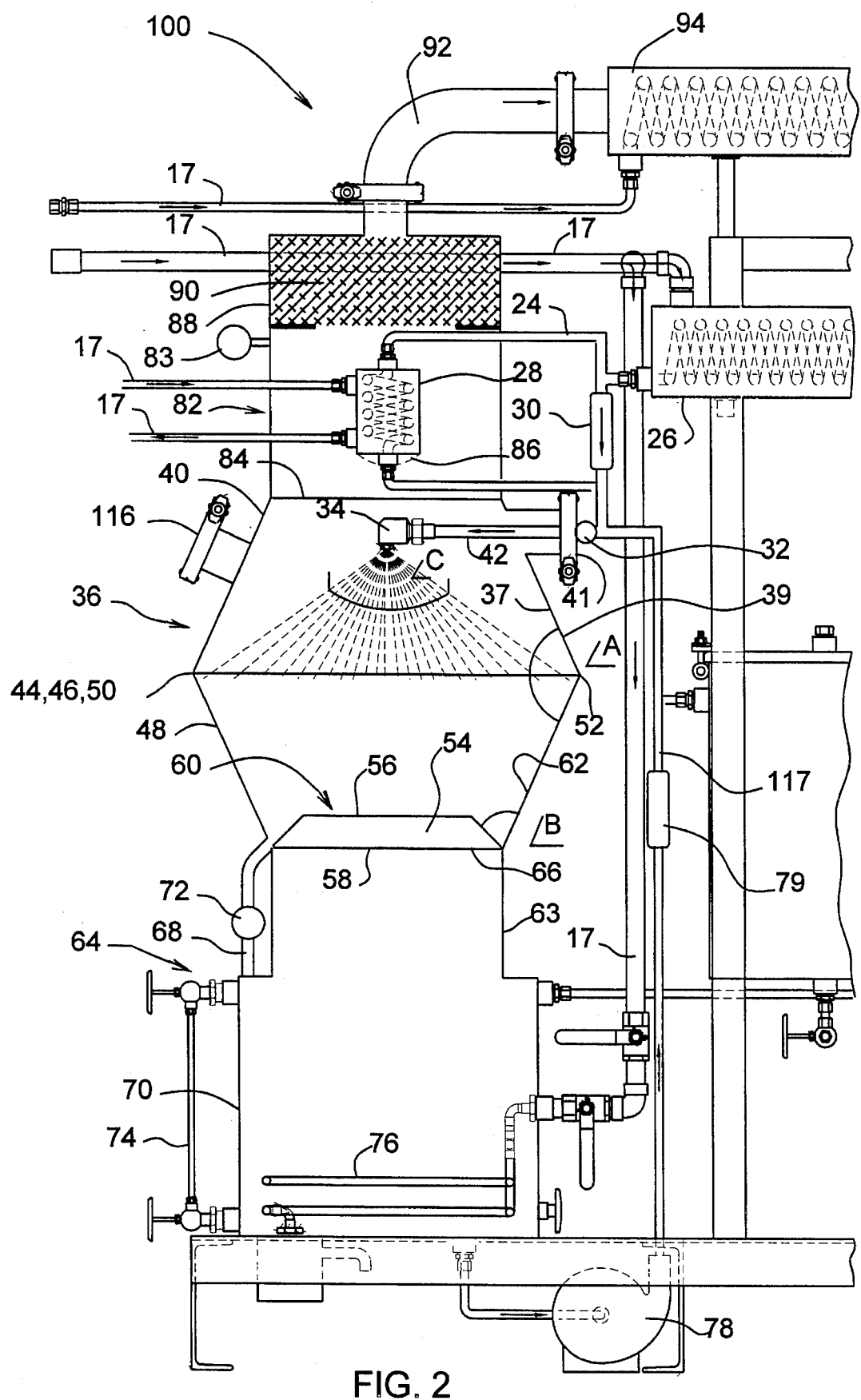
FIG. 2 is an enlarged front cutaway plan view of the VSC unit of the present invention showing an optional internal preheater and baffle.
Figure 3:
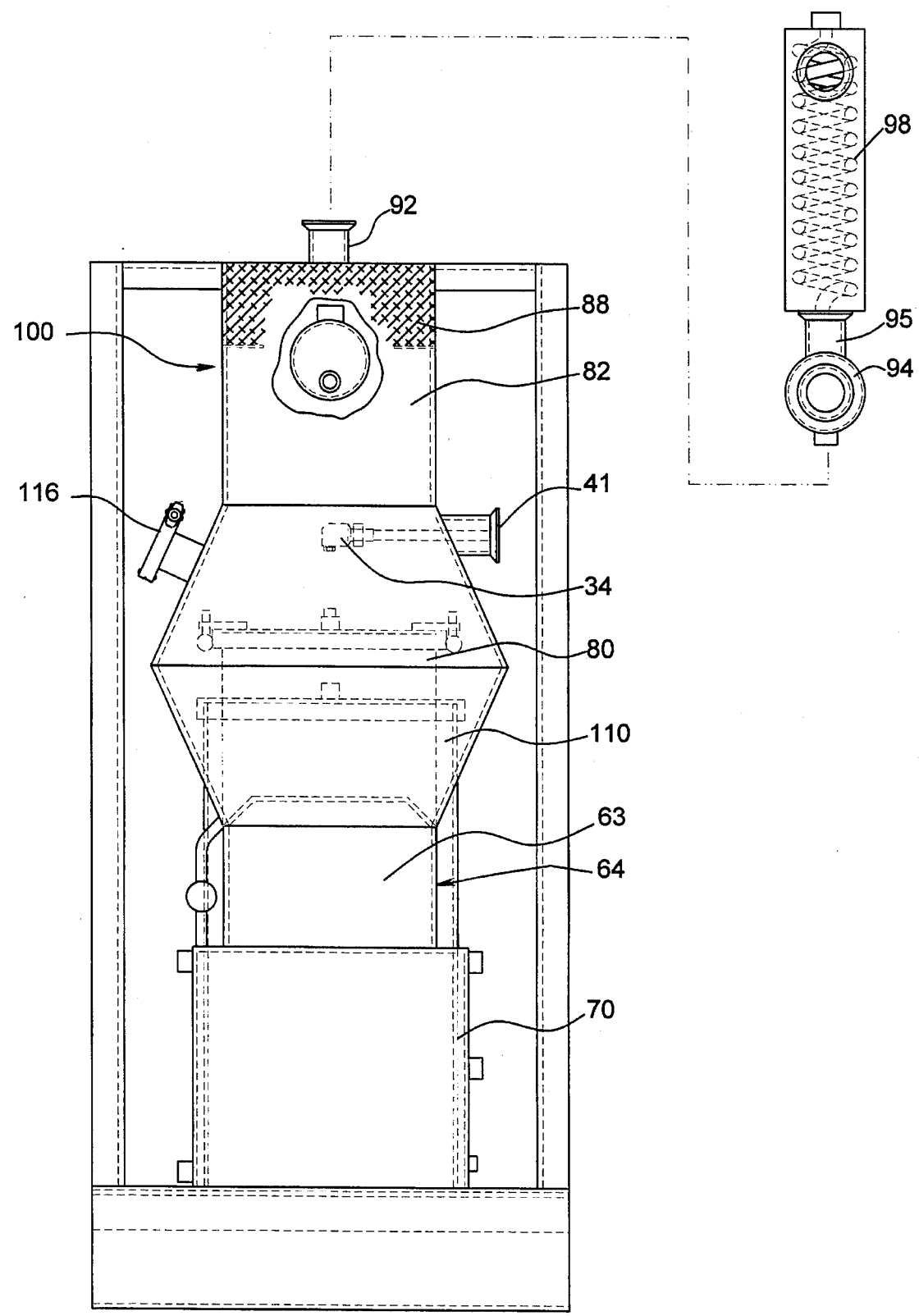
FIG. 3 is a side elevational cutaway view of the VSC unit showing the product containers and condensers in phantom lines.

Incorporated into the VSC unit 10 above the expansion chamber 36 is a generally cylindrical vacuum chamber 82 sized and complementary shaped and mounted in cooperative engagement onto the top edge 84 of the upper frustoconical expansion chamber 38. The vacuum chamber 82 receives the vapors 43 generated from the separation process in the expansion chamber 36. The vacuum is determined by a vacuum gauge 83. As shown in FIGS. 1 and 2, an optional first internal preheater 28 may be located in the lower portion of the vacuum chamber 82, wherein the preheater 28 may have a distribution baffle 86 associated with the preheater 28 as shown in FIG. 2. Alternatively, the vacuum chamber 82 may utilize a separate baffle or series of baffles (not shown) positioned therein, or remain void depending upon the chemical composition and physical characteristics of the feed substrate constituents to be separated and the properties of the resultant vapor product(s) 43.

Furthermore, the efficiency of the separation process of the preferred embodiment is enhanced by packing the vacuum chamber 82 with a fine copper wire mesh having a large surface area forming a catalytic pack chamber 88. The catalytic pack chamber 88 only receives the vapors 43 from the expansion chamber(s) 36 located below. The packing materials 90 of the catalytic chamber are selected depending upon the chemical composition of the volatiles of a particular process. For example, the use of copper mesh, i.e. nascent copper, has the affinity to capture sulfides and other complex sulfur compounds which are deleterious to wine or to other beverages and react with the sulfur to improve the quality of the vapor product before condensation. This catalytic pack chamber 88 can be and would be converted to other catalytic agencies such as gold mesh, platinum mesh, silver mesh, aluminum, ceramics such as raschig rings, or even activated charcoal as required for any chemical composition. Construction of the vacuum chamber 82 utilizes a lid or flange arrangement so that the copper mesh packing 90 can be removed periodically for cleaning and regeneration or completely replaced periodically.

The vapors 43 from the expansion chamber 36 pass through the vacuum chamber 82 by way of the catalytic packing chamber 88 and are transferred to a first vapor conduit 92 connected to a condensing system. At least one temperature indicator 96 is in communication with the vapor product 43 from the catalytic packing chamber 88. The condensing system consists of a first primary condenser 94, more particularly, a tube and shell heat exchanger for condensing at least a portion of the vapors 43 producing a vapor condensate product 47. Moreover for the alcohol water composition feed substrate, the VSC unit 10 utilizes an optional second vent condenser 98 having at least one temperature indicator 102 in communication therewith. Any vapors 43 exiting the primary condenser 94 are transferred through a second vapor conduit 95 and through the vent condenser 98 to condense the vapors 43 and recover all of the condensable product 47. Both of the condensers 94 and 98 are cooled using a water medium; however, it is contemplated that other heat transfer fluids or types of heat exchangers can be utilized in accordance with the process as described herein.

The vent condenser 98 is connected to a vacuum separator or vapor separator 104 for the vacuum system by a pipe line 106 and from there to a vacuum pump (not shown). The product condensate 47 which is obtained from the primary condenser 94 is transferred through line 97 which is connected to line 99 from the vent condenser 98 through a product cooler and rotameter 108 to a product receiving tank 110. A pump (not shown) pumps the vapor condensate product 47 to a receiving tank or optionally through a pipe line 112 to the base collector 64 for further processing.

Operation of the VSC unit 10 described in the preferred embodiment is as follows. A feed stream containing volatiles such as alcohol is preheated in the feed substrate preheater 26, 28 from about 100° F. to about 140° F. and fed through a feed port 41 inlet into the upper frustoconical expansion chamber 48 of the VSC unit 10 under 25" to 28" Hg vacuum supplied by a vacuum pump. The feed substrate is forced through a small atomizing nozzle 34 spraying the liquid in a 360° arc onto the inner wall 37 of the expansion chamber 36, more particularly at the waist 50 forming the maximum diameter of the expansion chamber 36. The spray angle and cone angle are selected according to the viscosity and volatility of the feed substrate. A sight glass 116 may be included within the expansion chamber 36 showing a spray wash nozzle and line assembly 117 positioned within the interior of the expansion chamber to wash the sight glass 116 and provide a clear means of visually checking the point of contact of the spray pattern with respect to the maximum diameter of the expansion chamber 36. A liquid annular collector baffle 60 attached to the interior lower sidewall 62 of the expansion chamber 36 extending inwardly and upwardly at an angle forming a trough 60 at the bottom of the expansion chamber 36 for collecting a desired amount of the reduced alcohol reside which spills over into the base collector 64. The volatiles and flavor congeners are vaporized and flow upward under vacuum into the catalytic packed chamber 88 and are concentrated in the alcohol stream which is condensed in the primary and vent condensers, 94 and 98, respectively as the vapor condensate product 47. The dealcoholized concentrated liquid product 45 containing low boiling chemical constituents is collected in a storage container.

An important design criteria involves the initial phase separation which starts at the spray nozzle 34 and continues until the droplets strike the wall. The primary mode of the maximum phase separation occurs at a point of 10 to 15 orifice diameters from the atomizer nozzle 34. The 10 to 15 diameters is based on the dimension of the atomizer nozzle opening. The method of heat transfer utilized in the low temperature applications of the VSC unit 100 is different from film type phase changes employed in conventional vacuum evaporators. The first stage of evaporation from the spray pattern developed in the expansion chamber 36 of the VSC unit 10 does not form bubbles as is typical with conventional evaporators used for low temperature distillation. The mass transfer separation employed herein is strictly a surface vapor pressure phenomenon of the more volatile component leaving the less volatile.

The basic difference between this process and film evaporation is that the VSC unit 10 creates droplets of mist type formations which produces much greater surface area as opposed to film evaporation. Also, most important of all, the feed substrate droplets entering into a gas expansion chamber 36 as a liquid droplet, are composed of the liquid and internal heat content which upon dispersion forms a fine mist which in turn gives off its heat as the vapors expand. During the expansion of the vapors there is cooling effect which creates further separation of the volatiles form the liquid product.

In contrast, in film type evaporation the bubbles which form will vary with the heat generated, etc. with the viscosity of the liquid, the velocity of the film, heat at the barrier metal and the bubble dimension. This invention excludes the film type phase change to reduce the residence time of the feed substrate with the heat transfer surface.

The typical film evaporation is accomplished by bubble formation, utilizing heat transfer to the liquid through the barrier metal. As the bubbles burst to the vapor phase, new bubbles continue to form. This occurs from a physically constant surface area.

Heat transfer in the VSC unit 10 is accomplished without the formation of bubbles. Surface area exposure of the feed substrate occurs with a phase change created by the dispersion of hundreds of droplets per second at diameters of $1/100$ inch is multi-fold over any film type evaporation and convection heat transfer. Furthermore, the total process time exposure in seconds for the heat sensitive product.

Flashing of the volatile components in the expansion chamber 36 is accompanied by gas expansion which causes cooling of the vapors formed. Moreover, lower volatility of the condensate phase is utilized in the VSC unit 10 as compared to conventional vacuum evaporators which are dependent upon vaporization of the product from direct contact with a heated surface within the evaporator. The VSC unit 10 is designed so that the temperature of the vapor product will not usually exceed 99° F. during the phase change for the instant alcohol/water binary mixture feed substrate at a given vacuum of from about 25 to about 29 inches of Hg. The temperatures of the liquid product produced from the instant feed substrate will range from about 95° F. to about 100° F. in the liquid phase within the base collector 64. Liquid in the base collector 64 is warmed by the low temperature steam coil 76 only when necessary to provide additional heat transfer through convection currents produced thereby. The internal heat supplied to the product is not only provided through the internal preheater 28, jacket 118, or coils 172, but by the expansion of gases which magnify the convective heat transfer due to the swirl and high velocity of the spray pattern and by the venturi effect of the vapors passing through the various stages of the VSC unit 100. The nonvolatile liquid product of reduced alcohol or alcohol-free beverage is pumped through a heat exchanger and cooled before storage.

Various temperature and vacuum gauges, (not shown), record temperatures and vacuum throughout the system and to maintain product temperatures in the range of less than 100° F. or less minimizing product degradation of heat sensitive products due to scorching. Of course, higher temperatures would be expected for non-heat sensitive products.

The liquids transferred from the vapor atomized state to the lower wall 62 of the lower expansion chamber flows to the liquid annular collector baffle 60 at the base of the expansion chamber 36 which is connected to the base collector 64 at the base 70 of the VSC operating unit 10 by a pipeline connection 68. The base collector 64 is supplied with the same reduced steam temperature and heat generating temperatures for providing the same temperatures involved in the initial phase separation for a particular feed substrate. The purpose of the final base collector 64 accompanied with a pancake coil heat exchanger 76 is to accommodate the requirements, for the alcohol composition both of the dealcoholized product or alcohol free product out of the base collector 64 and that of the vapors leaving the VSC unit 10 for condensation.

Furthermore, the droplets formed from the spray nozzle 34 contain the heat required for evaporation as they exit the nozzle 34. The surface are of the numerous small droplets provide a much greater surface area for heat transfer as compared to film and/or bubble evaporation. As pointed out heretofore, the size of the droplets is determined by the pressure differential between the feed pressure of between about 5 to about 7 atmospheres and the vacuum, about 28 inches of mercury, existing in the VSC unit 10. The size of the atomizing spray nozzle 34 and the liquid pressure applied determines the exit velocity and the size of the droplet itself which again is dependent on the pressure at the nozzle 34. As evaporation from the surface of the droplet occurs, the droplet decreases in size vaporizing or increasing in specific gravity and falling free to the liquid annular collector baffle 60 or base collector 64.

There is a critical relationship between the feed composition, nozzle size and the area of dispersion to the widest dimension of the expansion chamber 36. The obtuse angle of the expansion chamber 36, Angle A, is an important consideration in that nonvolatiles of the binary mixture flow down the inner wall 37 of the expansion chamber 36 to the liquid baffle collector 60 for further processing in the base collector 64. As the 300 micron size mist droplets from the spray fall vertically by gravity, less vapors are formed at the areas of decreasing diameter of the expansion chamber 36. This provides a steady vapor velocity upward throughout the expansion chamber 36 and into the vacuum chamber 82 for condensation.

Moreover, the liquid annular collector baffle 60 at Angle B serves to narrow the opening for the gas transfer from the base collector 64 and creates higher vapor velocities as well as a venturi effect. The volatiles component form gases exiting the restriction expand and cool reducing the vapor velocity, thereby creating additional binary separations. The binary phases separation enriches the volatile phase and allows liquid to return to the base collector 64. The expansion of the volatiles creating a cooling effect enhances the efficiency of the phase separation between gas and liquid. Thus, the expansion chamber 36 is designed to facilitate a liquid to phase separation due to gas expansion and cooling at the same time.

VDI—Becheft, page 12, 1939, No. 1., and Joseph E. Seagrams & Sons Research Department, Louisville, Ky., December 1947.

Column 3 shows the vapor compositions of ethanol-water solutions as constant boiling mixtures at 250 mm absolute for the liquid compositions of Column 1, wherein a 3% liquid phase yields a vapor phase of 22% by volume.

Column 4 shows the vapor compositions of ethanol-water solutions as constant boiling mixtures at 120 mm absolute for the liquid compositions of Column 1, wherein a 3% liquid phase yields a vapor phase of 22% by volume.

Column 5 shows the liquid compositions of ethanol-water solutions representing the actual data from the VSC unit 10 obtained at 120 mm absolute for compositions of up to a 3% liquid phase.

Column 6 shows the vapor compositions of ethanol-water solutions representing the actual data from the VSC unit 10 obtained at 120 mm absolute for the liquid compositions of Column 5, wherein a 3% liquid phase yields a vapor phase of 32.0% by volume.

Column 7 is the difference between Columns 2 using an CBM at 760 mm absolute and Column 6 using the VSC unit 10, wherein the difference between the vapor compositions shown in Column 7 is a result of the improved phase separation using the VSC unit 10, due to the enhanced heat transfer capabilities associated with the expanding gases produced in the VSC unit 10, and the massive surface area of the individual mist droplets to produce higher alcohol composition from the same liquid state radically enhancing the phase separation.

TABLE I

| | | ETHANOL/WATER VAPOR PRESSURES | | | | | | |
|---|---|---|---|---|---|---|---|---|
| CBM Liquid % by volume 760 mm | CBM Vapor % by volume 760 mm | CBM Vapor % by volume 250 mm | CBM Vapor % by volume 150 mm | VSC Liquid % by volume 120 mm | VSC Vapor % by volume 120 mm | CBM (2) vs. VSC (6) Differential Phase Separation | Sieve tray vapor composition live steam 760 mm | Tray (8) vs. VSC (6) Differential Phase Separation |
| 0.1% | 2.8% | | | 0.1% | 14.0% | 11.2% | 0.8% | 13.2% |
| 0.2% | 4.0% | | | 0.15% | 15.0% | 11.0% | 1.3% | 13.7% |
| 0.2% | 4.0% | | | 0.15% | 15.5% | 11.5% | 1.3% | 14.2% |
| 0.2% | 4.0% | | | 0.15% | 19.0% | 15.0% | 1.3% | 17.7% |
| 1.0% | 10.8% | | | 1.0% | 21.0% | 10.2% | 6.5% | 14.5% |
| 1.5% | 15.S% | | | 1.5% | 20.5% | 5.0% | 12.0% | 9.5% |
| 2.0% | 19.1% | | | 2.0% | 26.7% | 7.6% | 15.0% | 11.7% |
| 2.0% | 19.1% | | | 2.0% | 27.0% | 7.9% | 15.0% | 12.0% |
| 2.7% | 24.5% | | | 2.7% | 30.5% | 6.0% | 18.0% | 12.5% |
| 3.0% | 26.3% | 22.0% | 21.0% | 3.0% | 32.0% | 5.7% | 22.3% | 9.7% |

TABLE I Legend
"CBM" is Constant Boiling Mixture
"VSC" is Volatile Separator Concentrator
"Tray" is Conventional Sieve Tray Distillation Column Table I Provides statistical data of mixtures of ethanol-water solutions and the vapor pressures produced from the VSC unit 10. A comparison of the Columns of Table I show the improved phase separation effect of the VSC unit 10 as compared with conventional distillation equipment as a result of the high vacuum processing conditions and enhanced heat transfer utilized in the VSC unit 10. The data by E. Kirscbaum and F. Gerstner does not include liquid phase composition below 3% by volume of the liquid state. The data was obtained in 1939 and may have omitted any experimental data due to accuracy and or the reliability of analytical instruments available.

Columns 1 and 2 show the respective liquid and vapor composition of ethanol-water solution as a constant boiling mixture, ("CBM"), at 760 mm absolute pressure as taken from "E. Kirscbaum and F. Gerstner—Verfahrensstecknik Z., As shown in Table I, increasing the vacuum on a constant boiling mixture, ("CBM"), generally lowers the vapor composition. For instance, a 3% alcohol/97% water solution in equilibrium in a pot still distillation unit at total reflux at atmospheric pressure, has a liquid phase as shown in Column 1 of 3.0% by volume and a vapor phase as shown in Column 2 containing 26.3% by volume at 760 mm absolute, (approximately 29.9" Hg).

Increasing the vacuum on the CBM and processing the 3% alcohol/water solution using the same equipment at 250 mm absolute, (approximately 9.8" of Hg.), reduces the vapor phase from 26.3% by volume to 22% by volume as shown in Column 3. The reduction of the vapor phase by 4.3% by volume represents a gain in efficiency in that a greater amount of water is vaporized along with the alcohol.

Further increasing the vacuum on the CBM and processing the 3% alcohol/water solution in the same equipment at 120 mm absolute, (approximately 9.8" of Hg.), further reduces the vapor phase from 26.3% by volume to 21% by volume as shown in Column 4. The reduction of the vapor phase by 5.3% by volume represents a gain in efficiency in that a greater amount of water is vaporized along with the alcohol.

Processing the same liquid phase composition at or below 3% in the VSC unit 10 at 120 mm absolute yields liquid phase data shown in Column 5 which is similar to the liquid phase data of Column 1; however, the vapor phase data of Column 6 differs from the CBM data shown in Column 2. A comparison of the physical data results of Column 6 showing the 32.0% by volume vapor phase data of the VSC unit 10 at 120 mm absolute, with the CBM data of Column 2 showing the 26.3% by volume vapor phase data at atmospheric conditions (760 mm absolute), shows a difference or gain of 5.7% differential as shown in Column 7 for the vapor phase efficiency of the VSC unit 10 process. The data shows that processing the 3% alcohol/water binary mixture in the VSC unit 10 produces a vapor phase containing a greater concentration of alcohol.

Moreover, comparing the VSC unit 100 physical data results of Column 6 showing the 32.0% by volume vapor phase data of the VSC unit 10 at 120 mm absolute, with the CBM 22% by volume vapor phase data of Column 3 at 250 mm absolute shows an improvement of 10% differential in the vapor phase efficiency indicating that processing the 3% alcohol/water binary mixture in the VSC unit 10 produces a vapor phase containing a greater concentration of alcohol even when the 3% by volume liquid is processed under vacuum conditions in the conventional CBM equipment.

Furthermore, comparing the results of the VSC unit 100 physical data in Column 6 showing the 32.0% by volume vapor phase at 120 mm absolute, with the same CBM liquid phase data and the CBM vapor phase data of Column 4 shows a CBM having a 21% by volume vapor phase at 120 mm absolute. The differential shows an improvement of 11% in the vapor phase efficiency indicating that processing the 3% alcohol/water binary mixture in the VSC unit 10 produces a vapor phase containing a greater concentration of alcohol even when the 3% liquid substrate is processed under the same vacuum conditions as used in the conventional CBM equipment.

Column 8 includes physical data from a sieve tray column with live steam feed at the base operating at 760 mm absolute. The data shown for Column 8 of the sieve tray column vapor composition obtained for the same alcohol/water % by volume liquid compositions as set forth in Column 1, but different vapor compositions as compared to Column 2. Subtraction of the tray column data of Column 8 from the VSC unit 10 data shown in Column 6 yields the differential phase separation shown in column 9. A comparison of the physical data results of Column 6 showing the 32.0% by volume vapor phase data of the VSC unit 10 at 120 mm absolute with the 22.3% by volume vapor phase data at atmospheric conditions (760 mm absolute) in Column 8 yields a gain of 9.7% differential shown in Column 9 in the vapor phase efficiency. The 9.7% differential indicates that processing the 3% alcohol/water binary mixture in the VSC unit 10 produces a vapor phase containing a greater concentration of alcohol.

The dramatic difference in the performance of the VSC unit 10 is apparent because from the data at 120 mm of vacuum. Two of the factors involved that increase the differential vapor phase over that in Column 7 is the live steam feed has a negative impact as well as plate reflux downward in the column. In addition, this is a violent boiling mixture with relative liquid entrainment at high vapor velocities in the column.

The Kirscbaum tables do not have any data for the liquid compositions which are considered in this invention. All of their tables cover liquid to vapor phase compositions from 50 mm absolute to 740 mm vacuum from up to 3% by volume liquid phase the azeotrope.

Thus, a comparison of the data from the tables with the physical data obtained from operation of the VSC unit 10 show that the increased concentration of alcohol in the vapor phase for the VSC unit 10 as compared to conventional atmospheric or vacuum distillation equipment is due to the design of the VSC unit 10 maximizing heat transfer to increase the efficiency of the separation and concentration processes.

An alcohol beverage product, such as a wine, beer, or cooler product having an ethanol content of about 4 to about 14% would serve as a feed substrate. For example, processing of the 7% alcohol liquid in the VSC unit 10 at about 5 gpm, about 25" to about 28" Hg., and about 99° F. would produce a first vapor condensate product containing approximately 21% ethanol and a first liquid concentrate product containing approximately 0.5% ethanol, (dealcoholized wine). The first liquid concentrate product containing from about 0.05% to about 1.0% alcohol may be reconstituted with water, the feed substrate, or the first vapor condensate product to bring the alcohol level to the desired level, such as 1%, and incorporate a portion of the any desirable flavor constituents condensed from the vapor phase. The final concentrate product may therefore be fortified with fractions from the feed substrate and/or vapor condensate product to vary the chemical composition of the final product. Thus, the VSC unit 10 may be used as a selective distillation unit to produce fractions having a high congener level of a desired chemical composition. Fortification may then be accomplished using a larger percentage of the desired congeners constituents, such as ketones, to enhance the flavor or organoleptic properties of the concentrate or vapor condensate product.

Moreover, the alcohol content and/or volume of the final product can be adjusted by recycling a portion of the reduced alcohol content first liquid concentrate product through concentrate product discharge line 117 and valve 32 into the feed stream line 42 of the nozzle 34 before processing as a simple means to utilize a nozzle 34 of a particular design and size and obtain a variation in the alcohol content of the condensate product and concentrate product yet without having to make major changes to the processing parameters for the process. The original feed substrate could be reduced to accommodate the feed back volume.

Figure 11:
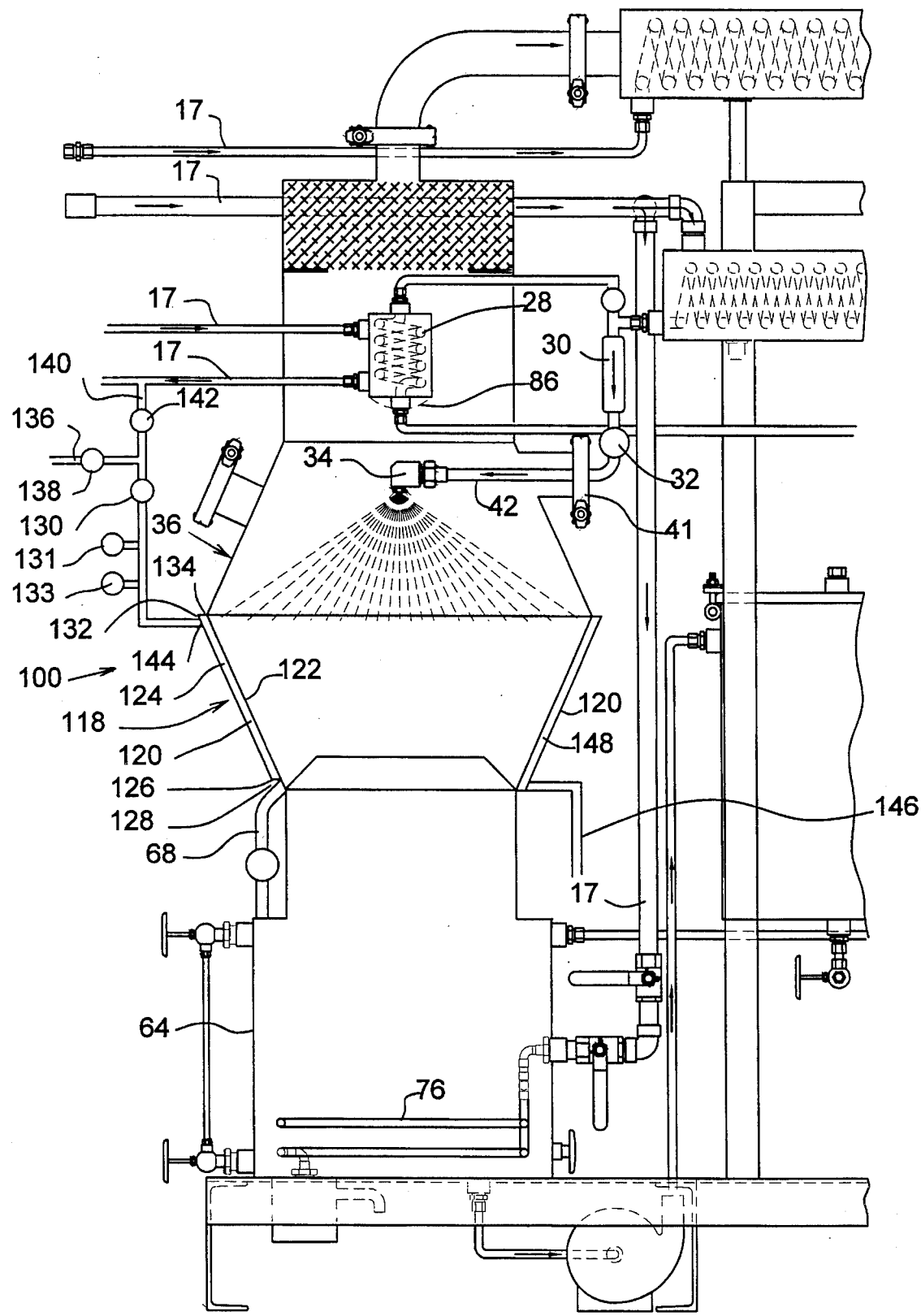
FIG. 11 is a plan front cutaway view showing an alternate embodiment of the VSC unit having a heat transfer jacket surrounding the expansion chamber.

As shown in FIG. 11, an optional jacket provides insulation and/or increase the efficiency of the VSC unit 10 by supplementing the heat produced in the preheater 26, 28 and/or base collector 64. The jacket 118 of the preferred embodiment, is comprised of metal designed to withstand the temperatures and pressures of the process, fabricated from material such as metal. The jacket 118 includes a sheet of material 120, spaced apart from and wrapped around the lower exterior wall surface 122 of the expansion chamber 36 forming a cavity or chamber 124 therebetween. The lower edge 126 of the sheet 120 is sealingly attached to the lower edge 128 of the expansion chamber exterior wall 122. The upper edge 132 of the sheet 120 is sealingly attached to the upper edge 134 of the lower exterior wall 122 of the expansion chamber 36. Heated fluid such as low pressure or steam or preferably heated water may be supplied through an independent line 136 through valve 138, or preferably, heated fluid discharged from the internal feed substrate preheater 28 may flow through line 140 and valve 142 to a connection 144 in fluid communication with the chamber 124 of the jacket 118 and exit though a discharge line 146 at the bottom of the jacket 118. Valve 130, temperature gauge 131, and pressure gauge 133 are used to control the desired flow, if any, of heating fluid to the jacket 118. Baffles 148, such as copper mesh, rasching rings, or strips of metal may be packed into the jacket 118 to provide for even distribution of the heating medium.

Figure 12:
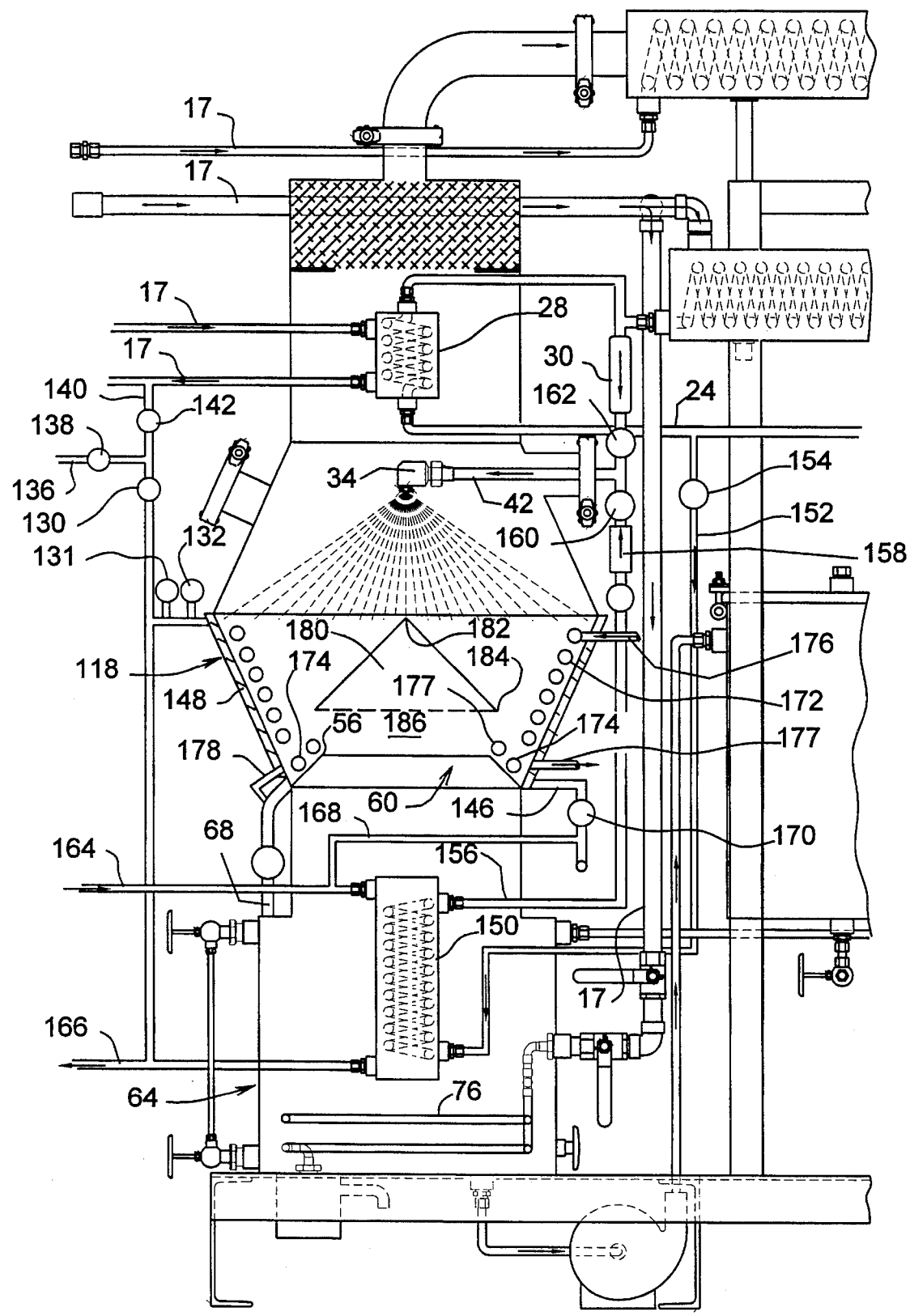
FIG. 12 is a plan front cutaway view showing an alternate embodiment of the VSC unit having a plurality of coils within the expansion chamber and annular collector baffle and preheater within the base chamber.

FIG. 12 shows the VSC unit 10 having an optional second internal preheater 150 mounted by attachment to the walls within the base collector 64. The preheater 150 may be used separately or in combination with either the external preheater 26 or the first internal preheater 28 to heat the feed substrate prior to expansion through the nozzle 34. The preheater 150 is supplied through line 152 connected to the feed pump line 24 through a connection and valve 154 wherein the feed substrate is pumped through the preheater 150 and out through line 156 through a rotameter 158 and valve 160 into the nozzle supply line 42. A valve 162 prevents backflow through the feed line from the first preheater 28. The heating medium such as steam, hot water, or other heating fluid may be supplied separately through line 164 and discharged through line 166, or the heating fluid discharged from the first internal preheater 28 may be recycled through supply line 40 to the second internal preheater 150. Moreover, heating fluid discharged from the jacket 118 may be recycled through the preheater 150 via supply line 168 and valve 170. Moreover, the preheater 150 provides within the base collector 64 provides a restriction to the upward flow of expanding gases; thereby, increasing the flow of the expanding gases between the preheater 150 and the inner edge 56 of the collection baffle 60 providing a venturi effect to enhance the convective current heat transfer of the expanding gases as the gases expand in the expansion chamber 36 thereabove.

An additional option shown in FIG. 12, is the addition of one or more metal, preferably, copper or aluminum coils 172 mounted to the interior of the lower tapered wall 62 of the expansion chamber 36. As shown, the coils 172 are spaced apart in pairs. Although the coils 172 may be spaced apart from the side wall for selected substrates as long as the liquid flowing along the wall 62 contacts the coils. The spacing of the coils 172 from the lower wall 62 provides for a single thin monolayer of film in contact with the heated coils 172. No bubble formation occurs on the surface of the coils 172 or wall 62 due to the thickness of the monofilm. The coils 172 in the preferred embodiment touch the surface of the inner wall 37. At least one of the coils 172 is positioned within the trough 174 formed by the annular collector baffle 60 reducing the liquid volume in the held in the trough and reducing the residence time of the concentrate collected therein. A heat transfer medium such as reduced steam or heated fluid may be circulated through the coils 172 from a separate external source line 176 or recycled from the discharge of one of the preheaters 26, 28, 150, or the jacket 118. The discharge from the coils 172 from discharge line 177 may be used as a feed source to a preheater 26, 28, 150, or the jacket 118. A by-pass means 178 may be used to maintain a desired level of liquid product within the trough 174 of the baffle 60. A perforated screen, preferably about 50 mesh 179 may be utilized within the baffle trough 174 covering the coils 172 to prevent turbulent boil up and entrainment to the base collector 64.

Use of the recirculating coils, generally is used with feed substrates requiring a higher temperature. For instance, a feed substrate between 100° F. and 140° F. enters the expansion chamber 36 to be discharged at the spray nozzle 34. Initial phase separation occurs at about 20" to about 28" of Hg., and more particularly at about a vacuum of 28" of Hg, as the spray mist is runs off of the waist 50 of the expansion chamber 36 and down the lower tapered sidewall 62 of the chamber 36.

The coils 172 serve to reduce radiation heat loss for phase separation. As the mist spray coalesces on the heated coils 172 and/or the side wall 62 of the lower expansion chamber 48, additional phase separation occurs. The two coils located within the baffle trough 174 reduce contact time due to the low liquid volume retained therein. The liquid at the phase change overflows the annular collector baffle 60 to the base collector 64.

At least one expansion chamber baffle 180 is mounted within the lower portion of the expansion chamber 48 below the spray discharge of the atomizing spray nozzle 34. The baffle 180 shown in the preferred embodiment of FIG. 12 is cone shaped. It should be noted that the baffle 180 may also be incorporated in the embodiment shown in FIG. 11 as well. The conical baffle 180 may be secured by attachment means, such as rods, to the interior walls 37 of the expansion chamber 36. As shown, the tip or top 182 of the conical baffle 180 is positioned at or below the maximum diameter or waist 50 of the expansion chamber 36. The largest diameter or bottom edge 184 of the conical baffle 180 extends outwardly greater than the reduced diameter edge 56 of the annular collector baffle 60. The dimensions and angle of the conical baffle 180 are determined by several factors; however, the obtuse angle of the cone is typically from about 110 degrees to 160 degrees. The conical baffle 180 prevents any free fall of droplets through the opening below the conical baffle 180 to the base collector 64. The baffle 180 directs the path of stray droplets and forms a barrier to vapors from below directing the vapors around the baffle 180 maximizing contact of the vapors with the heated surfaces of the walls and creating a venturi effect due to the expansion of the vapors and change in velocity of the vapors flowing around the baffle 180.

The greatest diameter 184 of the conical baffle 180 must exceed the inner diameter 56 of the annular collector baffle 60 so that any stray droplets from the atomizer nozzle 34 mist will cascade into the annular collector baffle 60 for phase change. Furthermore, the conical baffle 180 is mounted so as to leave an open area 186 between annular collector baffle 60 and the outer edge 184 of the conical baffle 180. The open area 186 provides a means for vapors to rise from the base collector chamber and expand in the expansion chamber 36. The conical baffle 180 also provides a restriction within the expansion chamber 36 forming the open area 186 which increases the velocity of the gases thereby producing a venturi effect further expanding and cooling the gases passing through the restricted open area 186 into the waist 50 of the expansion chamber 36. As the mist spray coalesces in the heated spiral coils 172 and/or the lower inner side wall 62, additional phase separation occurs. The coils 172 positioned within the baffle trough 174 reduces contact time due to the low liquid volume retained. The liquid at the phase change overflows the annular collector baffle 60 and flows downward to the base collector 64 to be removed as product, recycled into the feed stream, or further separated as a vapor.

Figure 13:
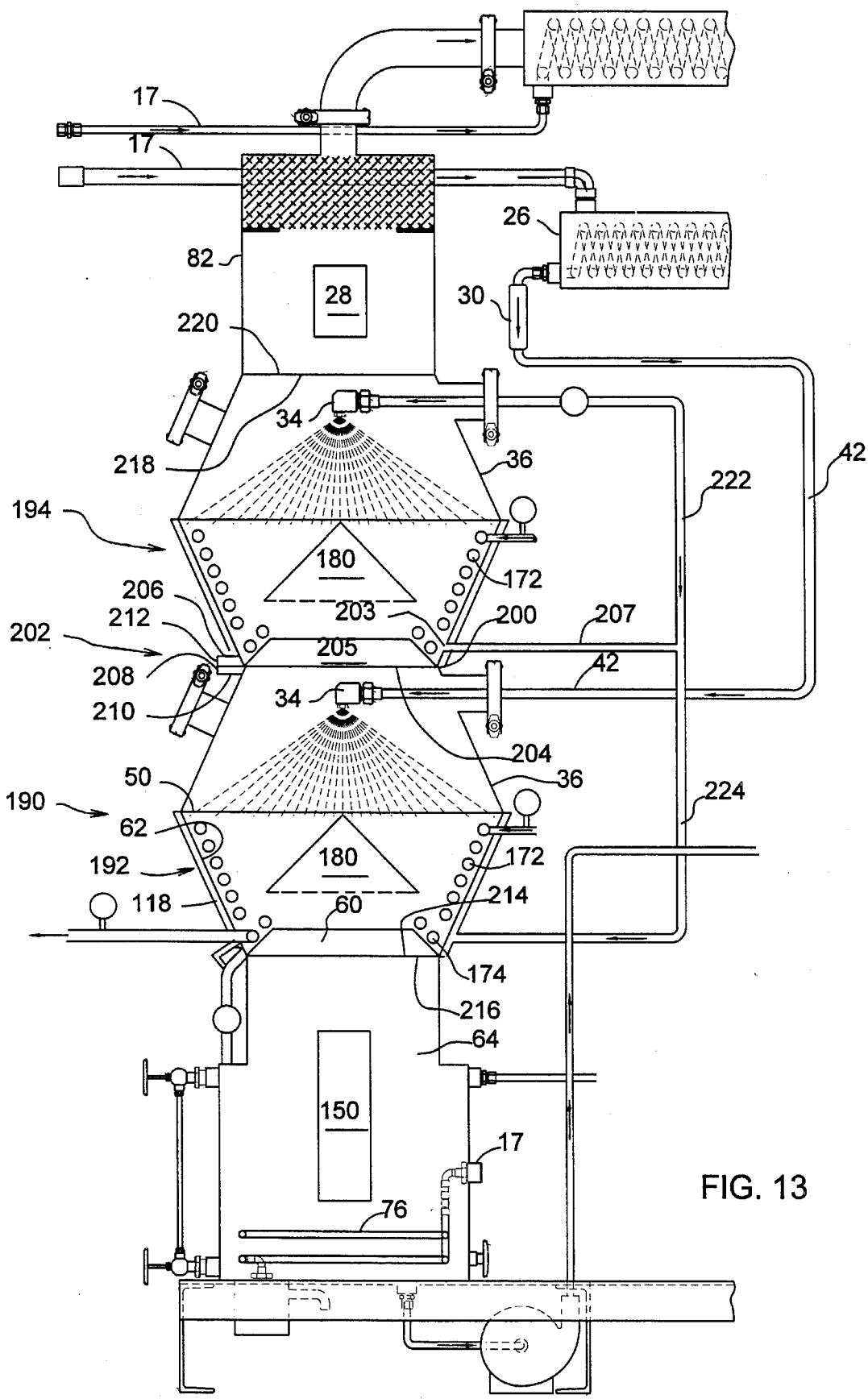
FIG. 13 is a plan front cutaway view showing a two stage stacked VSC multistage unit of the present invention.

The modular VSC unit 10 may be linked together in series or alternately several of the expansion chambers 36 may be mounted one upon the other in stages vertically to comprise a multi-stage VSC vacuum/atmospheric modular VSC processing 188. As shown in FIG. 13, a two stage VSC unit 190, having an expansion chamber 36 forming a first lower stage 192 and having an expansion chamber 36 forming a second upper stage 194. The construction of the second stage 194 is the same as the first stage 192. The reduced diameter expansion chamber bottom portion 196 of the upper stage 194 is joined to the reduced diameter expansion chamber top portion 198 of the lower stage 192 by a weld 200 or flange assembly 202 forming a reduced diameter waist 204 thereinbetween. The dimensions of the expansion chambers for the first stage 192 and second stage 194 are the same for the preferred embodiment shown in FIG. 13; however, it is contemplated that the dimensions could vary depending upon the feed substrate to be concentrated and processing conditions.

A typical flange assembly 202, such as may be used as an option instead of or in addition to welds 200, is shown in FIG. 13 as consisting of a first flange 206 extending around the bottom circumference of the upper stage 194 and a second flange 208 extending around the top circumference of the lower stage 192, wherein the pair of flanges 206 and 208 have mating holes therethrough permitting joining of the flanges 206 and 208 by means of bolts 210 inserted through the flanges 206 and 208. Moreover a means for sealing such as a gasket seal 212 may be inserted between the flanges to provide an air tight connection to withstand high vacuum conditions.

The same type of weld 200 or flange assembly 202 is utilized to connect the reduced diameter bottom portion 214 of the lower first stage 192 with the reduced diameter top portion 218 of the base collector 64; and to join the top portion 218 of the second upper stage 194 with the bottom portion 220 of the vacuum chamber 82.

In FIG. 13, the lower stage 192 receives the feed substrate through the nozzle 34. The feed substrate is heated to a temperature of between about 100° F. to about 140° F. The first phase separation occurs as the feed substrate is fed through the nozzle 34 producing an atomized mist sprayed against the maximum diameter or waist 50 of the expansion chamber 36 forming a vapor product which is pulled upward by vacuum, and a liquid concentrate product which drains down the lower sidewall 62 of the expansion chamber 36. Heated coils 172 provide additional heat to vaporize any of the volatiles in the liquid 195 which have not vaporized in the mist spray pattern. In addition, the lower wall 62 of the expansion chamber 36 of each stage 192 and 194 may be heated with an external jacket 118 to prevent radiation loss and to add low temperature heat to the expansion chamber 36. Furthermore, as shown in FIG. 13, both stages 192 and 194 incorporate conical baffles 180 therein.

More particularly, operation of the two stage VSC unit 190 under about 28" to 29" of Hg vacuum is accomplished by pumping the feed substrate through a selected preheater 26, or 28 and 150 having an alcohol content of from about 4% to about 14% into the spray nozzle 34 of the first lower stage 192. In the expansion chamber 36 of the lower first stage 192 the heated liquid substrate forms a first vapor product 193 and the non-volatilized portion of the feed substrate forms a first liquid concentrate product 195 which is discharged against the lower wall 62 of the expansion chamber 36 and flows downward along the wall 62 coming into contact with the coils 172 for further vaporization, whereby the nonvolatiles flow into the annular collector baffle 60 containing additional coils 172. The first concentrate product 195 overflow from the lower stage trough 174 is mixed with the concentrate product from the other stage(s) and overflows into the base collector 64. The concentrate product blend 201 is reheated (or chilled for storage) using the pancake coils 76. The concentrate product 201 from the base collector 64 contains from about 0.1% to about 0.05% alcohol.

The vapors formed from the volatiles of the feed substrate processed in the expansion chamber 36 of the first lower stage 192 form a first vapor product 193 containing from about 15% to about 20% alcohol by volume, flowing upward through the restriction formed by the annular collector baffle 60 of the upper stage 194. A portion of the first vapor product 193 is condensed thereby and flows down the side wall 62 of the second upper stage into the trough 203 formed by the collector baffle 205. The nonvolatilized portion of the feed substrate forms a second liquid concentrate product 199 containing from about 14% to about 15% alcohol by volume at a temperature of about 120° F. to about 140° F. A portion of the overflow from the upper stage trough 203 forming a second concentrate product 199 may as an option be pumped from the bottom of the second stage 194 of the VSC unit 190 through lines 207 and 222, through a rotameter 209 and control valve 211, and recirculated as feed to the spray nozzle 34 in the expansion chamber 36 of the second upper stage 194; however, typically a feed substrate containing about 12% to about 15% alcohol by volume is supplied from another VSC unit within the multi-stage vacuum/atmospheric system 188.

The unvaporized mist forming the second concentrate product 199 in the second upper stage 194 is discharged against the lower wall 62 of the expansion chamber 36 and flows downward coming into contact with the coils 172 for further vaporization and into the annular collector baffle 60 containing additional coils 172. The liquid concentrate 199 is further subjected to high vacuum conditions and the expanding gases formed from the heat transfer of the liquid with the coils 172, heated jacket 118, and pancake coil 76.

The second concentrate product overflow 199 from the trough 203 of the second upper stage 194 may also be recycled back through the nozzle 34 for processing in the first lower stage 192 through an overflow line 224 and blended with the first concentrate product 195.

The enriched vapors produced from processing the feed from the second upper stage 194 produces a second vapor product 197 containing about 50% to about 60% alcohol. The first vapor product 193 flows around the conical baffle 180 and mixes with the mist of spray particles discharged from the spray nozzle 34 of the second upper stage 194. Thereby the enriched vapors forming a second vapor product 197 containing about 50% to about 60% alcohol are mixed with a portion of the about 15% to about 20% alcohol content first vapor product 193 flowing upward through the second upper stage 194 from the first lower stage 192. The combination of the vapors 193 rising from the lower stage 192 at 15% to 20% alcohol composition added to the vapors 97 from the upper stage 194 at about 50% to about 60% alcohol composition forms a third vapor blend product 213 having an alcohol concentration of from about 35% to about 45% flowing upward through the catalytic packing chamber 88 and out through a series of condensers 94, 98 and are collected as a second condensate product 215.

The restriction and expansion areas formed by the baffles 180, expansion chambers 36, and annular collector baffles 60 form venturi which change the flowrate of the expanding gases providing a means for flashing the volatiles at multiple points throughout the multistage column and for cooling the gases.

One or more single VSC units 100, multi-stage VSC vacuum units 190, and/or multi-stage atmospheric units 189 may be connected together in modular form under about 20" to 29" of Hg vacuum. Preferably, as described in the preferred embodiment, the first modular unit receiving the feed substrate is a multistage vacuum unit 190 used for processing the heat sensitive feed substrate under 28" of Hg vacuum in a low temperature. The multistage VSC system 226 shown in FIG. 14 utilizes one multistage vacuum unit 190 connected in a series to a second multistage atmospheric unit 238, and a single stage atmospheric VSC unit 266 to reduce the ethanol content of the heat sensitive feed substrate from between about 4% to about 12% to about 0.1% to about 0.05% by volume for the heat sensitive concentrate product, and to produce a condensate product having an alcohol content of from about 75% to about 85% by volume. It is contemplated that all of the VSC units 190, 238, 266 could be operated under vacuum to process heat sensitive condensate products at a lower temperature depending upon the type of feed substrate selected.

As described previously with regard to FIG. 13, the combination of the vapors rising from the lower stage 192 at 15% to 20% alcohol composition added to the vapors from the upper stage 194 at about 50% to about 60% alcohol composition form a third vapor blend product 213 having an alcohol concentration of from about 35% to about 45% flowing upward through the catalytic packing chamber 88 and out through a series of condensers 94, 98 and are collected as a second condensate product 215. The first concentrate product 195 overflow from the lower stage trough 174 is mixed with the concentrate product from the other stage(s) and overflows into the base collector 64°. The third concentrate product blend 201 is reheated (or chilled for storage) by recirculating a suitable heat transfer medium in the pancake coils 76. The third concentrate product blend 201 from the base collector 64 contains from about 0.1% to about 0.05% alcohol.

Figure 14:
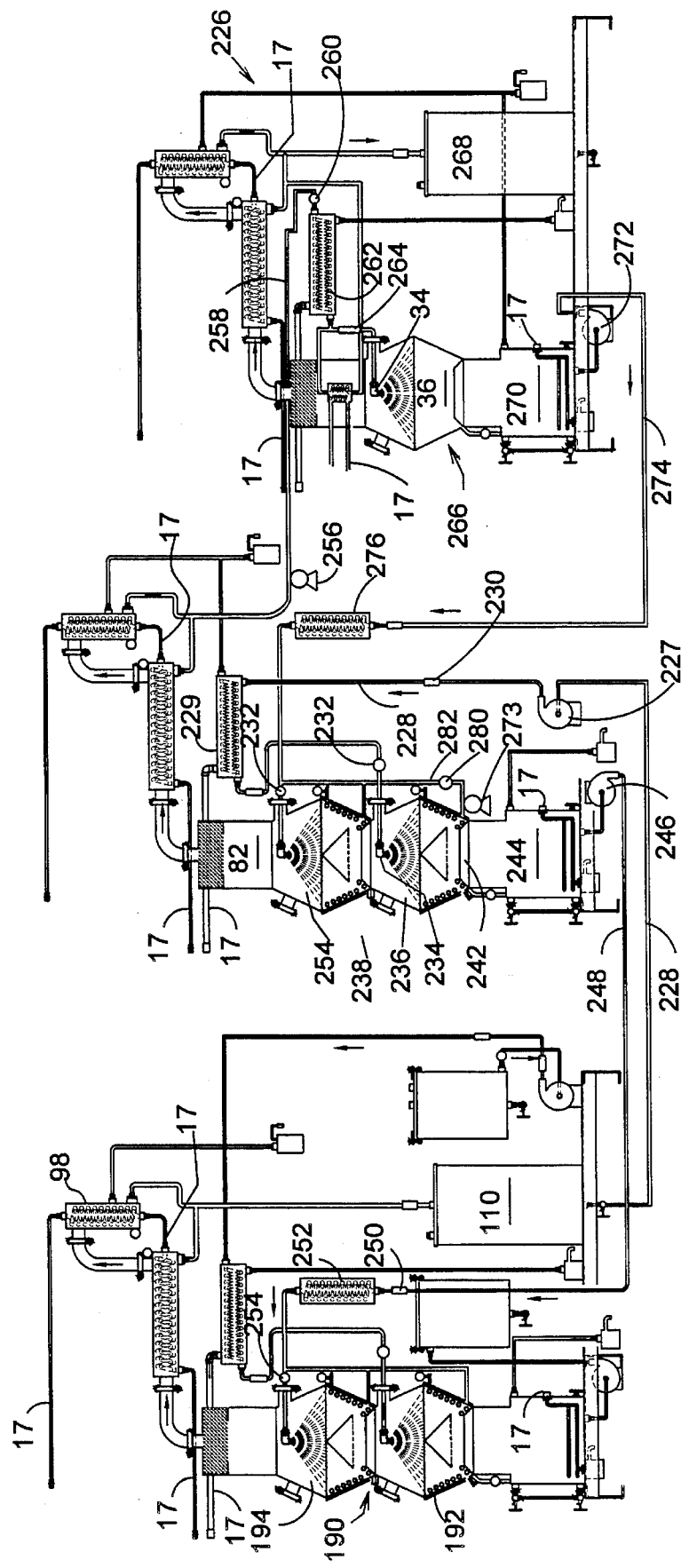
FIG. 14 is a plan front cutaway view showing a multistage VSC system including a first two stage stacked VSC vacuum unit module connected to a second two stage stacked VSC atmospheric unit module connected to a third single stage VSC module.

As shown in FIG. 14, the multistage VSC system 226 utilizes the second condensate product 215 containing from about 39% to about 45% alcohol from the vent condenser 98 of the two stage VSC unit 190 as an optional feed substrate to the first lower stage 236 of a second modular VSC unit 238. The second condensate product 215 collected in the condensate product tank 110 is pumped by pump 227 through line 228 through a preheater 229, rotameter 230 and control valve 232 to a atomizing spray nozzle 234 disposed within the expansion chamber 36 of the first stage 236 of the second two stage VSC unit 238 at controlled processing conditions to produce a conical spray pattern as described heretofore. The vapors formed from the first stage 236 of second VSC unit 238 expand upwardly forming a fourth vapor product 217 having an alcohol concentration of from about 50% to about 60% by volume. The nonvolatilized liquid flows downwardly along the side walls 62 of the first stage 236 into a trough 240 overflowing the collector baffle 242 as a fourth concentrate product 219 having an alcohol content of from about 12% to about 15% by volume. The fourth concentrate product 219 is generally pumped from the first stage 236 through pump 246, line 248, rotameter 250, preheater 252, and nozzle 34 as the main feed substrate source to the second stage 194 of VSC 190. The fourth concentrate product 219 from the first stage 236 of VSC unit 238 may be blended with the third concentrate product 201 from the second stage 194 of VSC unit 190 as a blended feed for processing in the second stage 194 of VSC unit 190.

The fourth concentrate product overflow 217 from the trough 240 of the first lower stage 236 may also be recycled back into the second upper stage 254 through an overflow line 282 connected to line 274 for processing in the upper stage 254 of the second VSC unit 238. The fourth concentrate product overflow 217 from the trough 240 of the first lower stage 236 may also be collected in the base collector 244 and mixed with concentrate products from upper stages to produce a sixth concentrate blended product 223 providing a feed substrate having a 12% to 15% alcohol content by volume.

Enriched vapors are produced within the second upper stage 254 from processing a feed substrate containing from about 50% to about 60% alcohol through the second upper stage 254. A fifth vapor product 221 is produced within the expansion chamber 36 of the upper stage 254 containing about 75% to about 85% alcohol. The fourth vapor product 217 flows around the conical baffle 180 and mixes with the mist of spray particles discharged from the spray nozzle 34 of the second upper stage 254. The enriched vapors forming the fifth vapor product 221 containing about 75% to about 85% alcohol are mixed with a portion of the fourth vapor product 217 containing about 50% to about 60% alcohol content flowing upward through the second upper stage 254 from the first lower stage 236. The combination of the vapors rising from the lower stage 236 with the vapors produced from the upper second stage 254 form a sixth vapor blend product 225 having an alcohol concentration of from about 70% to about 75% by volume flowing upward through the catalytic packing chamber 88 by vacuum and out through a series of condensers 94, 98 and collected as a third condensate product 227.

In the preferred multi-stage vacuum system 188, a single stage VSC unit 100, ("266"), receives the third condensate product 227 from the second two stage VSC unit 238. More particularly, the third condensate product 227 is pumped by pump 256 through line 258, a control valve 260, a preheater 262, and rotameter 264 through an atomizer spray nozzle 34 into the expansion chamber 36 of the third VSC single stage unit 266. Processing of the third condensate product 227 in the VSC single stage unit 266 produces a seventh vapor product 229 which is condensed into a fourth condensate product 231 having an alcohol content of about 75% to about 85% by volume which is collected as the final alcohol product into a product tank 268.

The liquid formed in the expansion chamber 36 and collected in the base collector 270 of the VSC single stage unit 266 forms a sixth concentrate product 233 having an alcohol content of about 50% to about 60% by volume. The fifth concentrate product is pumped through pump 272 through line 274, and preheater 276 to feed the spray nozzle 34 in the expansion chamber 36 of the upper stage 254 of the second VSC unit 236. Moreover, the combination of the vapors rising from the lower chamber at 50% to 60% alcohol composition added to the vapors from the upper chamber at 75% to 85% alcohol composition reach the condenser combined at 70% to 75% alcohol by volume which is recirculated to the VSC single stage unit 266 is feed condensate for further rectification to be removed as the final fourth condensate product 231 at about 75% to about 85% alcohol by volume.

A plurality of multi-stage vacuum and atmospheric units 189 may be connected together in modular form to provide a VSC processing system 290 utilizing one or more single stage VSC units 100 or multi-stage VSC units 190 operating under about 20" to 29" of Hg vacuum combined with atmospheric VSC units 100 or VSC atmospheric distillation columns 300 in low temperature processing applications to increase the alcohol from between about 4% to about 12% to a product having an alcohol content of from about 75% to about 85%.

Figure 15:
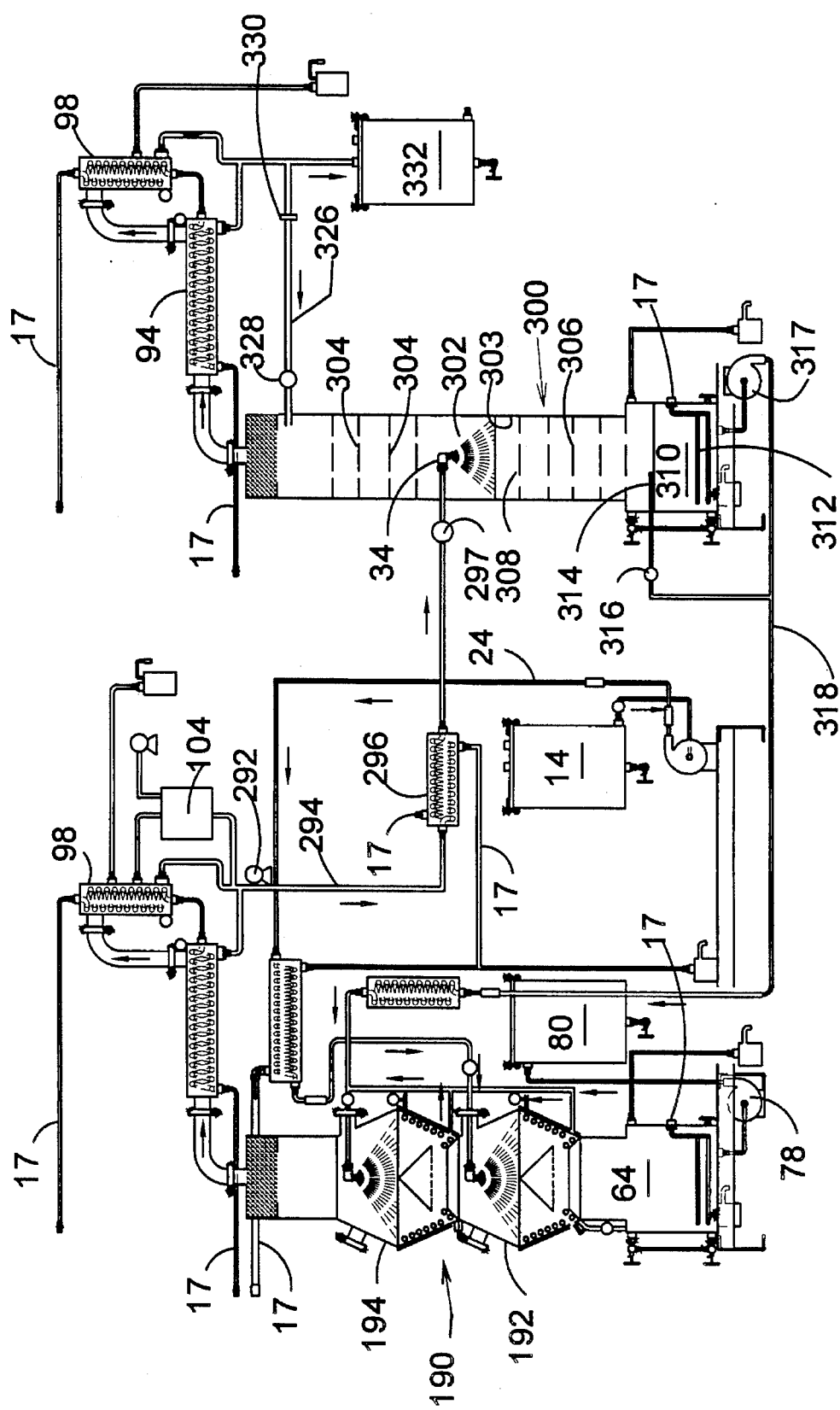
FIG. 15 is a plan front cutaway view showing a multistage VSC system including a first two stage stacked VSC vacuum unit module connected to a VSC column atmospheric unit; and Table I shows the vapor pressures of various mixtures of ethanol-water solutions before and after processing in the present invention.

As shown in FIG. 15, one or more multi-stage VSC vacuum units 190 operated under 20" to 29" of Hg vacuum may be connected in modular units to an atmospheric VSC column 300. Preferably, the first modular unit receiving the feed substrate is a multistage vacuum unit 190 used for processing the heat sensitive feed substrate under 28" of Hg vacuum in a low temperature. The multistage VSC system 226 shown in FIG. 15 utilizes one multistage vacuum unit 190 connected in a series to a second atmospheric column to reduce the ethanol content of the heat sensitive feed substrate from between about 4% to about 12% to about 0.1% to about 0.05% by volume for the heat sensitive concentrate product, and to produce a condensate product having an alcohol content of from about 75% to about 85% by volume. A vent condenser is connected to a vapor separator 104 for the vacuum system by a pipe line 106 and from there to a vacuum pump.

The double stage VSC unit 190 operates at about 28" of Hg vacuum in the manner described previously, wherein the VSC column 300 operates at atmospheric pressure. The feed substrate containing about 4% to about 12% alcohol is pumped through a preheater 26, 28, at about 10 gallons per hour and into the spray nozzle 34 of the first lower stage 192. In the lower first stage 192, the heated liquid substrate forms a first vapor product 193 containing from about 15% to about 20% alcohol by volume, and the nonvolatilized portion of the feed substrate overflows into the base collector 64 forming a first concentrate product 195 containing from about 0.1% to about 0.05% alcohol.

Typically a feed substrate containing about 2% to about 5% alcohol by volume is supplied from the atmospheric VSC distillation column 300 as feed to the upper stage 194 of the double stage VSC unit 190. The enriched vapors produced from processing the vapor product 193 of the first lower stage 192 and the 2% to 5% feed flowing to the second upper stage 194 produces a second vapor product 197 containing about 15% to about 35% alcohol. The enriched vapors forming a second vapor product 197 containing about 45% to about 65% alcohol are mixed with the first vapor product 193 containing 15 to 25% alcohol to form a third vapor blend product 213 having an alcohol concentration of from about 15% to about 25% alcohol by volume flowing upward through the catalytic packing chamber 88 and out through a series of condensers 94, 98 and are collected as a second condensate product 215.

Moreover, the nonvolatilized portion of the feed substrate produced in the second stage 194 of the VSC unit 190 forms a second liquid concentrate product 199 containing from about 12% to about 15% alcohol by volume at a temperature of about 120° F. to about 140° F. Further processing of the second concentrate product 199 in the first stage 194 further reduces the alcohol concentration to about 0.1% to about 0.05% collected in the base collector 64 as the final reduced alcohol product The liquid level is controlled in the base collector 64 by a flow control valve and an actuation to the valve on the discharge of product pump 78 to connected to the product tank 80. This is the reduced alcohol product tank. Coolant may be applied to the base collector 64 to cool the concentrate product to the desired temperature between about 35° F. and about 60° F.

The second condensate product 215 is pumped from the vent condenser 98 through a preheater 292 via line 294. A multiplate VSC column 300 employs a plurality of rectifying plates or stages to increase the alcohol content at atmospheric conditions for disposal. In this case, as a result of wine operations, the low strength condensate 215 at 15% to 25% alcohol, must be increased to qualify as wine product for wine fortification or brandy production.

The VSC column 300, serves to by means of a heating medium such as steam fed into the column 300 via a line 316, heat the condensate product from the volatile separator and concentrator unit 190 so as to separate the condensate product into two fractions, one with a higher boiling point than the other.

The second condensate product is pumped by feed pump 292 through line 294, a preheater 296, and a control valve 297 into the VSC column 300 through an atomizing conical spray nozzle 34. A pump 292, such as a Netsch screw pump is required to have the capability to pump from a high vacuum to an atmospheric condition. The pump 292 should have a NSPH (net suction head pressure) requirement of 1 ft. of head. The preheater heat exchanger 296 raises the temperature of the second condensate feed 215 in excess of 212° F. before entering the cylindrical expansion chamber 302 located near the center portion of the VSC rectifying column 300. As shown, the preferred embodiment provides three (3) rectifying plates 304 above the cylindrical expansion chamber 302 and four (4) dealcoholizing plates 306 below the cylindrical expansion chamber 302.

The same type of nozzle 34 is used in the VSC column 300 as is used in the VCS unit 100 described previously. The nozzle size is dependent upon the diameter of the VSC column 300. The atomized particles from the feed substrate contact the surface of the cylindrical expansion chamber 302 and flow down the sides 303 and flow through the dealcoholizing plates 306. The fourth vapor product 320 is rectified through the upper three rectifying plates 304 and condensed through a primary condenser 94 and vent condenser 98 forming a third condensate product 324. A portion of the third condensate product 324 flows through line 326, control valve 328, and rotameter 330 as reflux to the top rectifying plate 322. As a result of the reflux return from the third condensate product 324, the actual alcohol composition of the third condensate product collected in holding tank 332 is controlled between about 75% and about 85% alcohol by volume.

Moreover, the lowest, first dealcoholizing plate 308 drops its liquid to the base chamber 310 of the VSC column 300 which contains a heating element such as a tubular heat exchanger 312 containing a suitable heating medium such as low pressure steam or hot liquid transfer medium for reboiling the concentrate product 313 in the base chamber 330. The liquid concentrate 313 from the base chamber 310 of the VSC column 300 contains between about 2% to about 5% alcohol by volume. The liquid level within the base collector 310 is controlled by a float control 314 and a transfer Dump 316. The float actuator valve 316 controls the flow of the concentrate 313 utilized as a feed substrate pumped through line 318 and through a preheater 26, 28 from pump 317 to the VSC unit 190 where it is processed through the nozzle 34 in the expansion chamber 36 of the upper second stage 194 of the VSC unit 190.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. A volatiles separator and concentrator unit, comprising:
   an expansion chamber having sidewalls and being formed having an upper frustoconical portion connected to an inverted lower frustoconical portion having the maximum diameter in a central region thereof;
   a preheater connected to and in flow communication with said expansion chamber;
   an atomizing spray nozzle connected to a conduit extending from said preheater and disposed within said expansion chamber in flow communication with feed substrate for spraying said feed substrate within said expansion chamber and forming a hollow cone pattern producing a layer of droplets striking the sidewalls at the maximum diameter of said central region;
   a base collector attached to said lower inverted frustoconical portion in flow communication therewith;
   a vacuum chamber attached to said upper frustoconical portion in flow communication therewith;
   a pump connected to a feed substrate source and said preheater by conduits, said pump pressurizing said feed substrate and pumping said feed substrate at a selected flow rate through said preheater and said spray nozzle;
   means for supplying heat to said preheater;
   at least one condenser in flow communication with said vacuum chamber for condensing vapors collected in said vacuum chamber;
   means for removing condensate product from said condenser;
   means for forming a vacuum in said expansion chamber and vacuum chamber; and
   means for regulating the vacuum in said first expansion chamber.

2. The volatiles separator and concentrator unit of claim 1, including a filter for filtering the feed substrate.

3. The volatiles separator and concentrator unit of claim 1, including an annular collector baffle disposed circumferentially between said lower frustoconical portion and said base collector.

4. The volatiles separator and concentrator unit of claim 1, wherein said vacuum chamber includes packing for forming a catalytic packed chamber.

5. The volatiles separator and concentrator unit of claim 4 wherein said packing is selected from the group consisting of copper mesh, gold mesh, platinum mesh, silver mesh, aluminum mesh, ceramic rings and activated charcoal.

6. The volatiles separator and concentrator unit of claim 1, including a conical baffle disposed within said inverted lower frustoconical portion of said first expansion chamber positioned below said atomizing spray nozzle and extending outwardly toward said sidewall to cover the smallest diameter portion of an annular collector baffle positioned therebelow.

7. The volatiles separator and concentrator unit of claim 1, wherein said preheater is internally disposed within the vacuum chamber above said first expansion chamber.

8. The volatiles separator and concentrator unit of claim 1, including a heat transfer coil in said base collector, said coil being in fluid connection with a heat transfer medium for heating or cooling a liquid concentrate product contained within said base collector.

9. A multi-stage volatiles separator and concentrator unit, comprising:
   a first expansion chamber having sidewalls and being formed having an upper frustoconical portion connected to an inverted lower frustoconical portion having the maximum diameter in the central region thereof;
   an atomizing spray nozzle connected to a conduit extending into said first expansion chamber in flow communication with a first feed substrate for spraying said first feed substrate within said first expansion chamber and forming a hollow cone pattern producing a layer of droplets striking the sidewalls at about the maximum diameter of said central region;
   a second expansion chamber having sidewalls and being formed having an upper frustoconical portion connected to an inverted lower frustoconical portion having the maximum diameter in the central region thereof mounted above and attached to the top of said first expansion chamber having an atomizing spray nozzle connected to a conduit extending into said second expansion chamber in flow communication with a second feed substrate for spraying said second feed substrate within said second expansion chamber and forming a hollow cone pattern producing a layer of droplets striking the sidewalls at about the maximum diameter of said central region;
   a preheater in fluid connection to and connected to said first expansion chamber;
   a base collector attached to said lower inverted frustoconical portion of said second expansion chamber in flow communication therewith;
   a vacuum chamber attached to said upper frustoconical portion of said first expansion chamber in flow communication therewith;
   at least one pump for pressurizing and pumping said first feed substrate at a selected flowrate through said preheater and said spray nozzle of said first expansion chamber;
   means for supplying heat to said preheater;
   at least one condenser in flow communication with said vacuum chamber for condensing vapors collected in said vacuum chamber;
   means for removing condensate product from said condenser;
   means for forming a vacuum in said first expansion chamber, said second expansion chamber, said base collector and said vacuum chamber; and
   means for creating and regulating the vacuum in said first expansion chamber, said second expansion chamber, said base collector and said vacuum chamber.

10. A multi-stage volatile separator and concentrator column, comprising a cylindrical column having a plurality of rectifying plates positioned above a cylindrical expansion chamber and a plurality of dealcoholizing plates positioned below said cylindrical expansion chamber, including an atomizing spray nozzle disposed within said cylindrical expansion chamber, a base chamber containing a heating element containing a suitable heating medium therein for reboiling a concentrate product, means for controlling the liquid level in said base chamber, and means for removing said concentrate product.

11. A multi-stage volatiles separator and concentrator unit, comprising:
   a first expansion chamber having sidewalls and being formed having an upper frustoconical portion connected to an inverted lower frustoconical portion having the maximum diameter in the central region thereof;

an atomizing spray nozzle disposed within said first expansion chamber for spraying a hollow cone pattern producing a layer of droplets striking the sidewalls at about the maximum diameter of said central region;

a second expansion chamber having sidewalls and being formed having an upper frustoconical portion connected to an inverted lower frustoconical portion having the maximum diameter in the central region thereof mounted above and attached to the top of said first expansion chamber having an atomizing spray nozzle disposed therein for spraying a hollow cone pattern producing a layer of droplets striking the sidewalls at about the maximum diameter of said central region;

a base collector attached to said lower inverted frustoconical portion of said second expansion chamber in fluid communication therewith;

a vacuum chamber attached to said upper frustoconical portion of said first expansion chamber in fluid communication therewith;

means for pressurizing a feed substrate and pumping said feed substrate through a preheater and said spray nozzle of said first expansion chamber and said second expansion chamber;

means for condensing vapors collected in said vacuum chamber;

means for forming a vacuum in said first expansion chamber, said second expansion chamber, said base collector and said vacuum chamber;

means for regulating the vacuum in said first expansion chamber, said second expansion chamber, said base collector and said vacuum chamber;

means for regulating the pressure of a feed substrate through said atomizing spray nozzle(s); and means for regulating the flow rate of a feed substrate through said atomizing spray nozzle(s).

12. A volatiles separator and concentrator unit, comprising:

an expansion chamber having sidewalls and being formed having an upper frustoconical portion connected to an inverted lower frustoconical portion having the maximum diameter in a central region thereof;

an atomizing spray nozzle disposed within said expansion chamber in flow communication with said feed substrate for spraying said feed substrate within said expansion chamber and forming a hollow cone pattern producing a layer of droplets striking the sidewalls at the maximum diameter of said central region;

a base collector attached to said lower inverted frustoconical portion in flow communication therewith;

a vacuum chamber attached to said upper frustoconical portion in flow communication therewith;

means for supplying heat to a preheater;

means for condensing vapors collected in said vacuum chamber in flow communication including means for removing condensate product therefrom;

means for forming a vacuum in said expansion chamber and said vacuum chamber; and means for regulating the vacuum in said first expansion chamber; and means in fluid connection to said feed substrate for pressuring and regulating the flow rate of said feed substrate at a selected flow rate through said spray nozzle.

* * * * *